United States Patent [19]
Ennis, Jr. et al.

[11] Patent Number: 5,867,483
[45] Date of Patent: Feb. 2, 1999

[54] METHOD AND APPARATUS FOR MEASUREMENT OF PEAK THROUGHPUT IN PACKETIZED DATA NETWORKS

[75] Inventors: James D. Ennis, Jr., Ijamsville; John E. Hasselkus; Robert J. Norberg, both of Germantown; Robert Troutman, Gaithersburg; Matthew A. Tucker, Myersville, all of Md.

[73] Assignee: Visual Networks, Inc., Rockville, Md.

[21] Appl. No.: 746,416

[22] Filed: Nov. 12, 1996

[51] Int. Cl.$^6$ .............................. H04J 3/14; H04L 12/26
[52] U.S. Cl. .................. 370/252; 370/253; 395/183.22; 395/184.01
[58] Field of Search .................................. 370/232, 233, 370/234, 241, 252, 253, 465, 468; 395/183.22, 184.01

[56] References Cited

U.S. PATENT DOCUMENTS

| | | |
|---|---|---|
| 4,484,326 | 11/1984 | Turner . |
| 4,769,810 | 9/1988 | Eckberg, Jr. et al. . |
| 4,775,973 | 10/1988 | Tomberlin et al. . |
| 4,905,171 | 2/1990 | Kiel et al. . |
| 5,179,549 | 1/1993 | Joos et al. . |
| 5,251,152 | 10/1993 | Notess . |
| 5,265,091 | 11/1993 | van Landeqem . |
| 5,274,625 | 12/1993 | Derby et al. . |
| 5,295,135 | 3/1994 | Kammerl ................................ 370/233 |
| 5,313,454 | 5/1994 | Bustini et al. . |
| 5,315,580 | 5/1994 | Phaal ...................................... 370/253 |
| 5,343,465 | 8/1994 | Khalil . |
| 5,359,593 | 10/1994 | Derby et al. . |
| 5,446,874 | 8/1995 | Waclawsky et al. . |
| 5,488,607 | 1/1996 | Vinel et al. ............................. 370/253 |
| 5,629,927 | 5/1997 | Waclawsky et al. ................... 370/253 |

*Primary Examiner*—Min Jung

[57] ABSTRACT

A system for measuring peak throuput in packetized data networks includes a remote monitoring probe and console. The probe is connected to a packetized data network to monitor network activity, while the console is in communication with the probe via a communications medium. The probe maintains a plurality of counters associated with different ranges of utilization percentage for access channel and individual circuit bandwidth. For each sampling interval, the probe measures the access channel and individual circuit bandwidth utilization and increments the appropriate counters associated with the percentage ranges encompassing the measured bandwidth utilizations. The console polls the probe for the percentage counter data to selectively display the access channel or individual circuit bandwidth utilization in the form of a bar graph and pie chart. The access channel and/or individual circuit bandwidth may ultimately be adjusted based on the displayed data. Alternatively, the system may analyze the data and determine conservative, moderate and aggressive recommendations for bandwidth adjustment. In addition, the system can generate reports containing the access channel or individual circuit bandwidth utilization for a user-specified time period, and the recommendations for bandwidth adjustment.

31 Claims, 19 Drawing Sheets

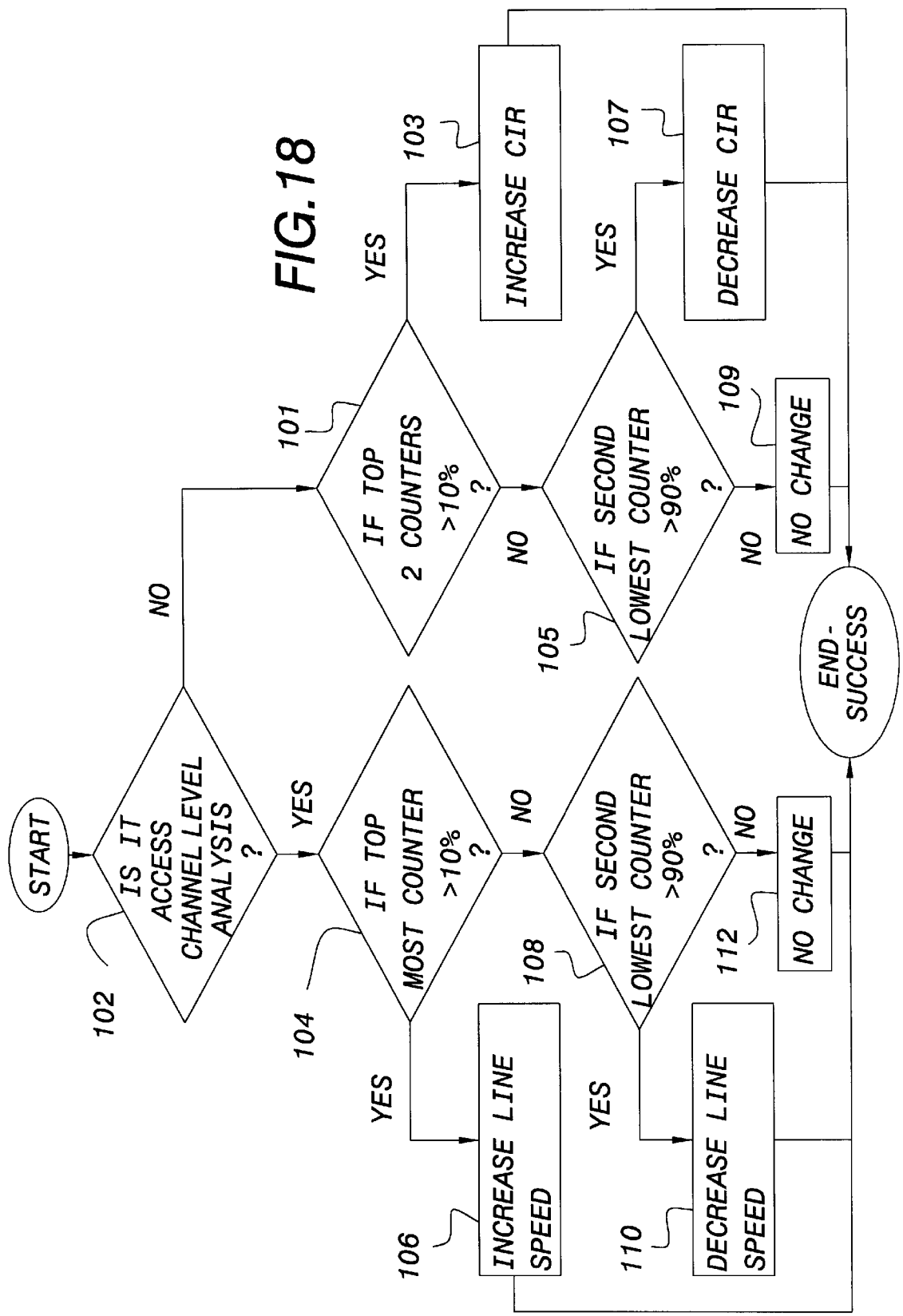

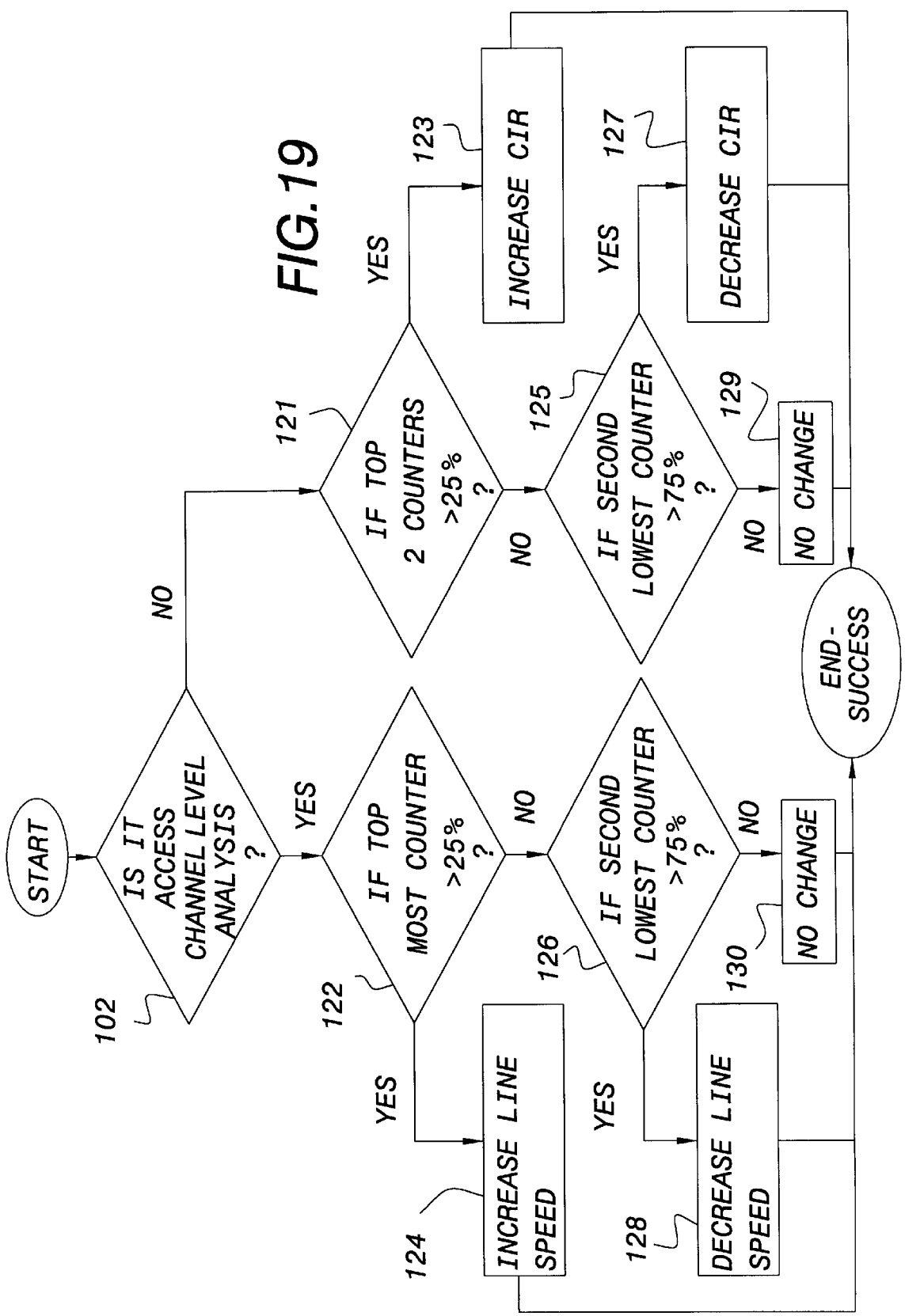

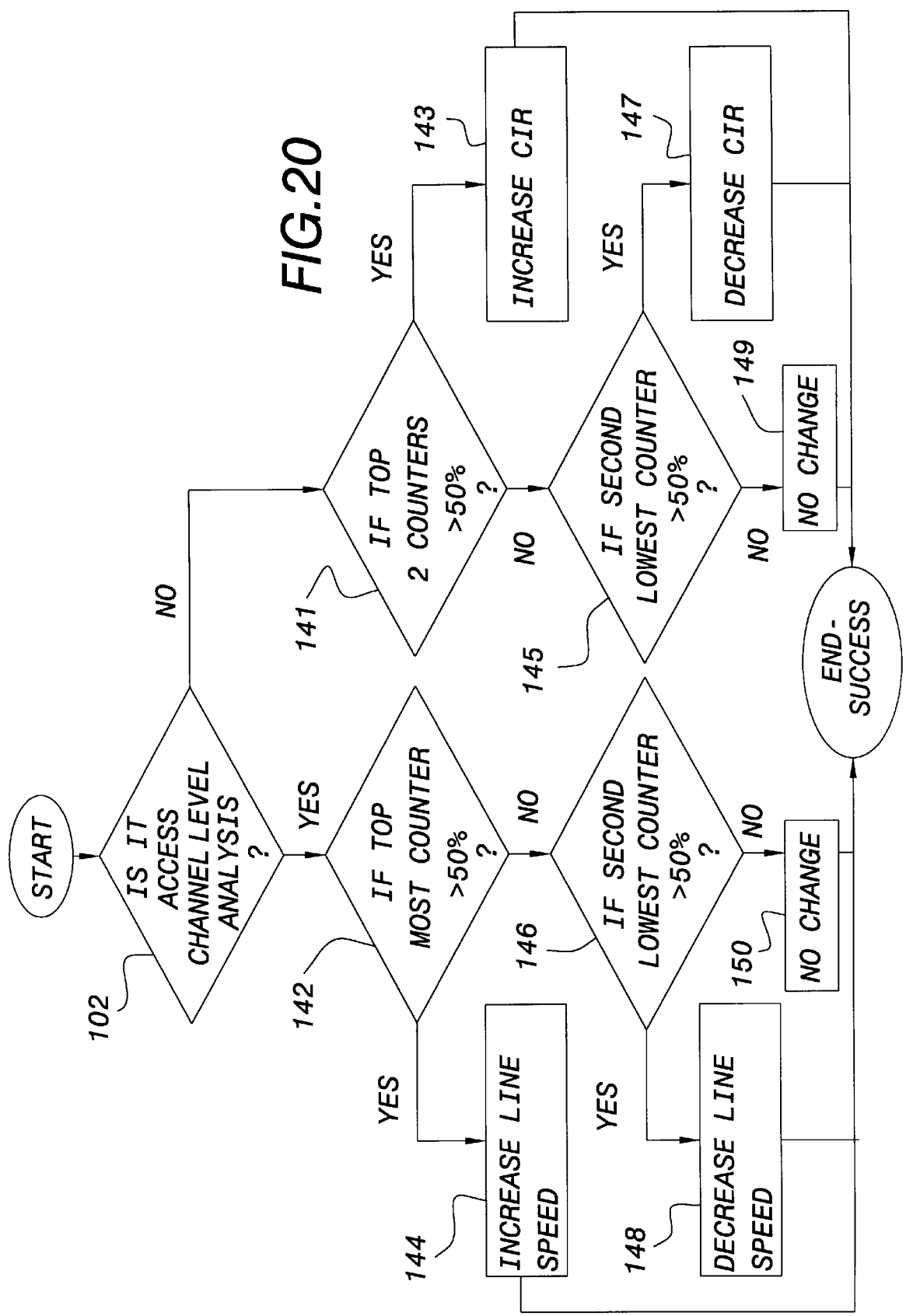

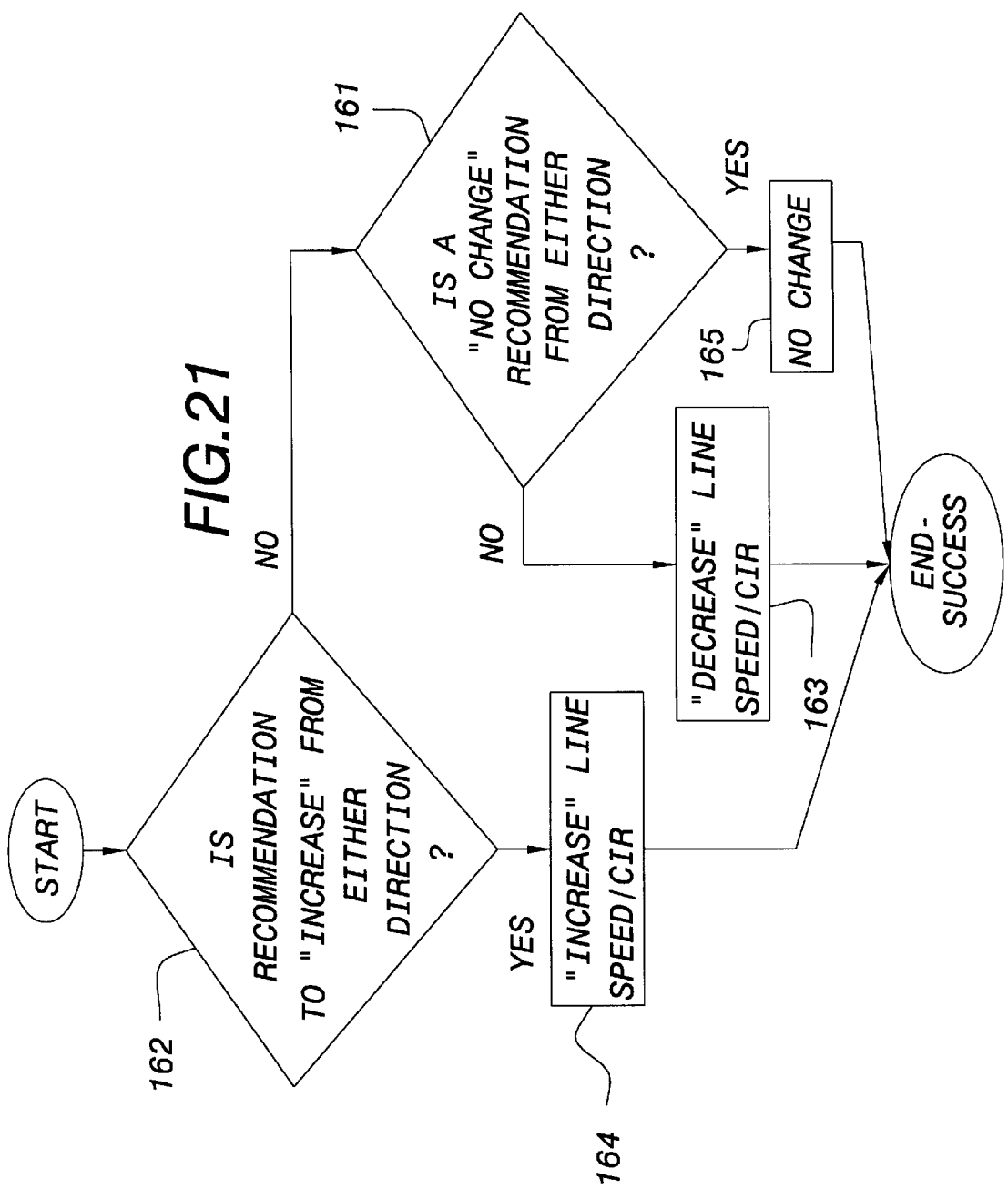

METHOD AND APPARATUS FOR MEASUREMENT OF PEAK THROUGHPUT IN PACKETIZED DATA NETWORKS

BACKGROUND OF THE INVENTION

1. Technical Field

The present invention pertains to monitoring data transmission through communications systems. In particular, the present invention pertains to monitoring methods and apparatus for measuring and displaying peak throughput in data transmission systems to assess bandwidth utilization for an entire access channel or individual transmission circuits. The present invention is related to the system disclosed in U.S. Pat. No. 5,521,907 (Ennis, Jr. et al) the disclosure of which is incorporated herein by reference in its entirety.

2. Discussion of Prior Art

Communications systems, especially packetized data networks, are currently utilized in various applications for transmission and reception of data across varying distances. Packetized data networks (e.g., local and wide area networks) typically format data into packets for transmission to a particular site. In particular, the data is partitioned into separate packets at a transmission site wherein the packets usually include headers containing information relating to packet data and routing. The packets are transmitted to a destination site in accordance with any of several conventional protocols known in the art (e.g., Asynchronous Transfer Mode (ATM), Frame Relay, High Level Data Link Control (HDLC), X.25, etc.), by which the transmitted data are restored from various packets received at the destination site.

Packetized data communications are especially appealing for common carrier or time-shared switching systems since a packet transmission path or circuit is unavailable only during the time when a packet utilizes the circuit for transmission to the destination site, thereby permitting other users to utilize that same circuit when the circuit becomes available (i.e., during intervening periods between packet transmissions). The access channel (i.e., channel connecting a site to a communications system) and each individual transmission circuit typically have a maximum data carrying capacity or bandwidth expressed in units of bits per second (bits/second). The access channel utilization is typically measured as an aggregate of the individual circuit utilizations and has a fixed bandwidth, while the individual circuits may be utilized by several users wherein each user may utilize an allocated portion of the circuit bandwidth (e.g., the frame committed information rate (CIR)). In other words, the committed information rate is the amount of bandwidth guaranteed to the user for a data transmission circuit. When a user sends data on a circuit in excess of the circuit committed information rate, the additional data exceeding the rate might possibly be discarded during transmission, depending upon circuit traffic conditions, thereby requiring re-transmission and degrading performance. Since the cost of bandwidth is directly proportional to the bandwidth quantity, cost effective communications systems tend to utilize the minimum amount of bandwidth necessary to facilitate data communications.

In order to determine the proper bandwidth requirements for an access channel or specific circuit, it is desirable to monitor access channel and circuit activity and view the bandwidth utilization. Various prior art monitoring systems are available that measure traffic, throughput, load and other communications system characteristics. For example, U.S. Pat. No. 4,775,973 (Tomberlin et al) discloses a communications measurement matrix display for a protocol analyzer wherein the protocol analyzer measures, and the matrix display shows, communications between nodes on a packet-switched network. The protocol analyzer passively monitors the network and measures network traffic in accordance with a user selected time interval (i.e., one second through four hours). The matrix display shows the network traffic via a grid having markers indicating the volume of traffic between two specific nodes (i.e., the first thirty-one nodes are individually specified and a single grid location is reserved for remaining nodes in the network in excess of thirty one), or the magnitude of traffic between one specific node and each of the other nodes. The protocol analyzer utilizes counters to maintain the amount of frames transmitted between nodes during a user-specified interval.

Further, U.S. Pat. No. 5,251,152 (Notess) discloses a system for collecting and displaying statistical data for a plurality of local area networks (LAN) wherein several remote nodes attached to a LAN collect and analyze LAN data (i.e., traffic) to produce statistics relating to the data. The statistics are sent to a management node for storage in a history file. The history file is periodically compressed to maintain the history file size at a manageable level. The remote nodes employ various counters to produce the data statistics relating to network and packet characteristics, while the management node utilizes the statistics for various displays to show the network information. For example, the management node includes a traffic distribution display wherein vertical bars illustrate percentages of packets within a particular time interval having certain packet lengths.

U.S. Pat. No. 5,446,874 (Waclawsky et al) discloses a system for maintaining a standard of operation for a data communications network. The system initially monitors the network for a certain duration to generate benchmark data sets that contain the standard of operation for the network. The benchmark data sets are typically categorized by traffic type or activity (e.g., batch, interactive, voice, etc.). Current network activity is measured by the system and compared to the benchmark data sets via criteria modules that interface to an expert system. When the network activity is determined to be beyond normal behavior, the criteria modules notify the expert system such that the expert system may modify network routing, close applications or allocate additional bandwidth. In addition, the benchmark data sets may be modified or updated to include a recent representation of network behavior.

The prior art suffers from several disadvantages. Typically, probes utilized for monitoring communications system activity have limited resources and memory. Since communications system traffic bursts (i.e., peaks or surges in system traffic) endure for short periods of time, the probe must collect information from the system at short sampling intervals to properly monitor traffic burst activity. However, monitoring the communications system with short sampling intervals for extended periods of time generates a large sample base that may exceed the probe's memory. For example, a probe with a one second sampling interval monitoring a communications system for fifteen minutes accumulates nine-hundred measurements. Although Notess (U.S. Pat. No. 5,251,152) utilizes file compression to maintain file size, the compressed file may still grow to exceed the probe's memory capacity, while the additional processing to compress and read the compressed file degrades performance. Further, incorporating additional processing and memory resources into the probes to accommodate large sample bases increases costs. Moreover, prior art devices generally display the amount or lengths of data traversing a communications system, thereby requiring the operator to determine system traffic and bandwidth utilization based on the data volume information. There is typically no provision to display the percentage of bandwidth utilized over a predetermined time interval in graphical form showing periods of high and low bandwidth utilization to enable an operator to quickly determine appropriate actions for adjusting the bandwidth to accommodate system behavior.

OBJECTS AND SUMMARY OF THE INVENTION

Accordingly, it is an object of the present invention to monitor data transmission systems and display bandwidth utilization for the access channel or an individual transmission circuit over a predetermined time interval.

It is another object of the present invention to collect bandwidth utilization information for a data transmission system via a remote monitoring probe by utilizing a series of counters within the probe representing varying percentage ranges of bandwidth utilization for the access channel or an individual transmission circuit to reduce the storage requirements for the sample base and accommodate limited memory resources of the probe.

Yet another object of the present invention is to collect bandwidth utilization information for a data transmission system and analyze that information to advise an operator as to the manner in which to adjust bandwidth for the access channel or an individual transmission circuit.

Still another object of the present invention is to monitor bandwidth utilization for a data transmission system and display the percentage of bandwidth utilization for the access channel or an individual transmission circuit in the form of bar graphs and pie charts, thereby showing the time periods of heavy and light bandwidth utilization.

The aforesaid objects are achieved individually and in combination, and it is not intended that the present invention be construed as requiring two or more of the objects to be combined unless expressly required by the claims attached hereto.

According to the present invention, a remote monitoring probe connected to a data transmission system monitors system activity (i.e., throughput). The data transmission system includes a plurality of sites and a packet switching network wherein the switching network typically resides between the sites to facilitate communications. Each site is connected to the switching network via an access channel wherein transmission circuits, preferably virtual circuits, establish paths between the sites through the access channel and switching network. A virtual circuit is basically a path established in a packet switching network to transfer data to a specific destination or site. The probe collects information relating to access channel and circuit level utilization wherein the access channel refers to the aggregate utilization of all defined transmission circuits, while the circuit level utilization refers to the utilization associated with a single transmission circuit, such as a permanent virtual circuit (PVC) or a switched virtual circuit (SVC). A console in communication with the probe polls the probe after a predetermined time period, or upon user request, to retrieve data collected by the probe. The probe determines the number of bits transmitted on specified transmission circuits and an individual access channel for each predetermined sampling interval, preferably set for one second. A series of counters is utilized by the probe to collect bandwidth utilization for the access channel and the individual circuits wherein each counter represents a different bandwidth utilization percentage (i.e., the percentage of the bandwidth capacity utilized) range. The probe maintains a series of counters for access channel bandwidth utilization for data traveling in each direction to and from the switching network, and for each individual circuit for data traveling to the switching network. The probe measures the bandwidth utilization for the access channel and each individual circuit, and increments, after each sampling interval, the counters for the access channel and individual circuits that correspond to the percentage of bandwidth utilization measured during that interval. The counters typically maintain information for each fifteen minute interval (i.e., nine hundred seconds), and are then reset to gather information for the next interval. The counter information for the fifteen minute interval is stored in the probe until transferred to the console to display the access channel and individual circuit bandwidth utilization over a user selected time interval.

The probe counters represent distinct bandwidth utilization percentage ranges that vary depending upon whether the bandwidth utilization is determined for the access channel or an individual circuit. When the access channel bandwidth utilization is measured (i.e., typically a fixed bandwidth), the probe maintains a set of counters for data traveling in each direction to and from the switching network representing the overall utilization percentage (i.e., percentage of bandwidth capacity utilized) range of zero through one-hundred percent. However, when an individual circuit utilization is measured wherein the bandwidth is allocated among several users (i.e., with each user utilizing a portion of the bandwidth, or having a committed information rate as described above), the probe maintains a set of counters for each circuit (i.e., for data traveling to the switching network) representing circuit utilization percentages (i.e., percentage of committed information rate utilized) in the range extending from zero to greater than one-hundred eighty percent. The probe utilizes the circuit committed information rate, or the access channel rate (i.e., full bandwidth capacity of the access channel) divided by two when the committed information rate is not available, as the bandwidth capacity value for determining the bandwidth utilization for the circuit as described above. A bandwidth utilization exceeding one-hundred percent indicates that data transmitted in excess of the committed information rate might possibly be discarded since the circuit exceeds its guaranteed bandwidth.

After a predetermined time interval, upon user request, or at user-specified times, the console polls the probe to receive the bandwidth utilization information (i.e., the data accumulated by the plurality of percentage range counters). The console manipulates the information for display in graphical form. Specifically, the console displays the information via a conventional graphical user interface or window containing a bar graph and pie chart indicating the percentage utilization of the access channel or individual circuit bandwidth utilization. The user specifies whether to view the access channel (i.e., for data traveling in each direction to and from the switching network) or a particular circuit utilization (for data traveling to the switching network), and the time interval over which the data is to be displayed (e.g., two hours, two days, etc.). The bar graph typically includes a horizontal axis partitioned into fifteen minute intervals extending for the user selected time interval, and a vertical axis partitioned into one-hundred percentage points corresponding to the percentage of seconds within each fifteen minute interval on the horizontal axis. The bandwidth utilization percentage ranges associated with the probe counters are color coded such that a multi-colored bar extends along the vertical axis for the entire one hundred percentage points of each fifteen minute interval on the horizontal axis to indicate the amount of time within the fifteen minute interval that the bandwidth utilization was in a particular percentage range. The vertical extension of the various colors within each vertical bar indicates the percentage of seconds within the fifteen minute interval that the bandwidth utilization was in the percentage range represented by the color. Since the sampling interval is typically one second, the counts maintained by the counters represent the number of seconds the access channel or individual circuit operated at a particular utilization. A separate bar graph is shown for each direction of data travel in the access channel.

The pie chart represents the access channel or individual circuit bandwidth utilization for a fifteen minute interval selected by the user from the bar graph. The pie chart is color coded as described above for the bar graph to indicate the amount of time within the selected fifteen minute interval that the bandwidth utilization was in a particular utilization percentage range. A separate pie chart is shown for each direction of data travel in the access channel wherein a particular pie chart shows the direction associated with the bar graph from which the fifteen minute interval is selected.

The display conveys to an operator the bandwidth utilization for the access channel for each direction or for an individual circuit (i.e., for a single direction unless a second probe is utilized at a destination site) for the requested time interval. The access channel or circuit bandwidth may be subsequently reduced based on low utilization percentages, thereby reducing system costs. The access channel or circuit bandwidth may also be increased based on peak times of operation or high utilization percentages to enhance system performance. The bandwidth adjustments to the access channel or circuit maybe accomplished in any conventional manner, preferably via a data transmission system provider, and typically require reconfiguration of the data transmission system. Alternatively, the operator may command the console to analyze the access channel and individual circuit bandwidth utilization data and advise the operator as to the manner in which to adjust the access channel or circuit bandwidth.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 18 is a procedural flow chart illustrating the manner in which the console determines a conservative recommendation for bandwidth adjustment according to the present invention.

FIG. 19 is a procedural flow chart illustrating the manner in which the console determines a moderate recommendation for bandwidth adjustment according to the present invention.

FIG. 20 is a procedural flow chart illustrating the manner in which the console determines an aggressive recommendation for bandwidth adjustment according to the present invention.

FIG. 21 is a procedural flow chart illustrating the manner in which the console determines a recommendation for bandwidth adjustment from analysis of recommendations determined for data traveling in each direction on the access channel (i.e., to and from the switching network) and/or individual circuit (i.e., data traveling to the switching network wherein two directions are utilized when a probe is located at each end of the circuit) according to the present invention.

DESCRIPTION OF THE PREFERRED EMBODIMENTS

Figure 1:
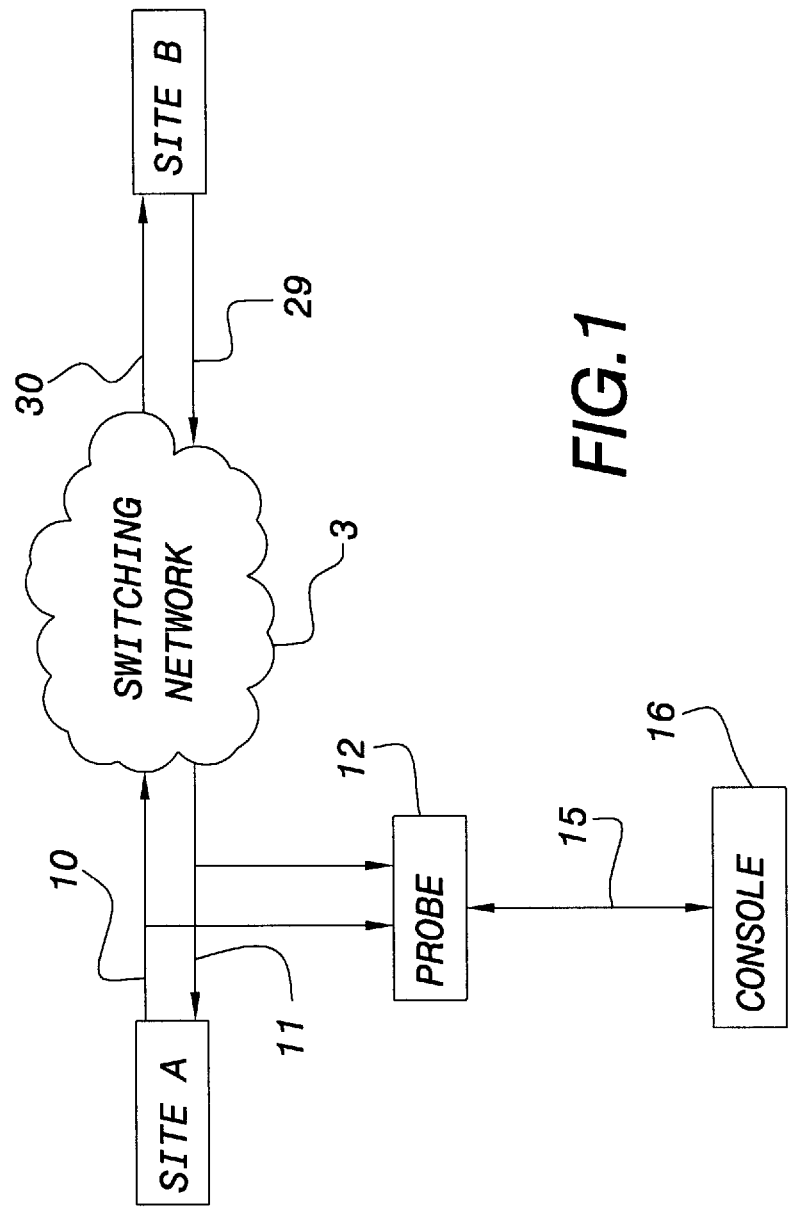
FIG. 1 is a functional block diagram of a data transmission system having a probe monitoring access channel and individual circuit utilization and a console in communication with the probe for processing probe data according to the present invention.

A system for monitoring data transmission system throughput and rendering bandwidth adjustment recommendations is illustrated in FIG. 1. Specifically, an exemplary data transmission system includes two sites (A and B) and a packet switching network 3 to facilitate communications between the sites. Site A is connected to network 3 by communication lines 10, 11, while site B is connected to network 3 via communication lines 29, 30. The data transmission system typically includes conventional telecommunications line types, such as T3, OC-3, North American T1 (1.544 Mbits/second), CCITT (variable rate), 56K or 64K North American Digital Dataphone Service (DDS), and a variety of data communications connections, such as V.35, RS-449, EIA 530, X.21 and RS-232. Sites A and B are each capable of transmitting and receiving data packets in various protocols utilized by communication lines 10, 11, 29, 30, such as Asynchronous Transfer Mode (ATM), Frame Relay, High Level Data Link Control (HDLC) and X.25. Each line 10, 11, 29, 30 represents a respective transmission direction as indicated by the arrows. For example, communication lines 10, 29 represent transmissions from sites A and B to the switching network, respectively, while communication lines 11, 30 represent transmissions to sites A and B from the switching network, respectively. A probe 12 is connected to each communication line 10, 11 to capture and process data packets being sent between sites A and B via the switching network. The probe captures data packets departing from the probe via the connection to communication line 10, and captures data arriving at the probe via the connection to communication line 11. As used herein, the term "to the switching network" refers to the direction of data traveling to the switching network (e.g., data traveling on communication line 10),while the term "from the switching network" refers to the direction of data traveling from the switching network (e.g., data traveling on communication line 11). The terms "arriving", "to the switching network", "departing", and "from the switching network" are all relative and are employed to imply transmission direction. By way of example, the probe is disposed between the switching network and site A, however, the probe may be connected to the communication lines at any point between the switching network and a site, and the system may include several probes connected to the system at various locations.

Generally, site A and site B utilize switching network 3 to communicate with each other wherein each site is connected to the switching network via an access channel having transmission circuits, preferably virtual circuits, that establish paths between the sites through the access channel and switching network. The access channel refers to the lines utilized by each site to communicate with the switching network (i.e., communication lines 10, 11, 29, 30), while a virtual circuit is basically a path established through a packetized data switching network that transfers data to a specific endpoint or site. The probe monitors circuit level and individual access channel utilization wherein the access channel utilization refers to the aggregate utilization of all defined transmission circuits, while the circuit level utilization refers to the utilization associated with a single transmission circuit, such as a permanent virtual circuit (PVC) or a switched virtual circuit (SVC). Probe 12 passively monitors data transmission system activity (i.e., access channel and individual circuit throughput) and collects information for processing by a console 16. The probe collects the information via utilization of a series of counters as described below. Console 16 is in communication with probe 12 via secondary communication line 15 (e.g., a local area network (LAN)), and retrieves the information collected by probe 12 to process the information for display as described below.

Figure 2:
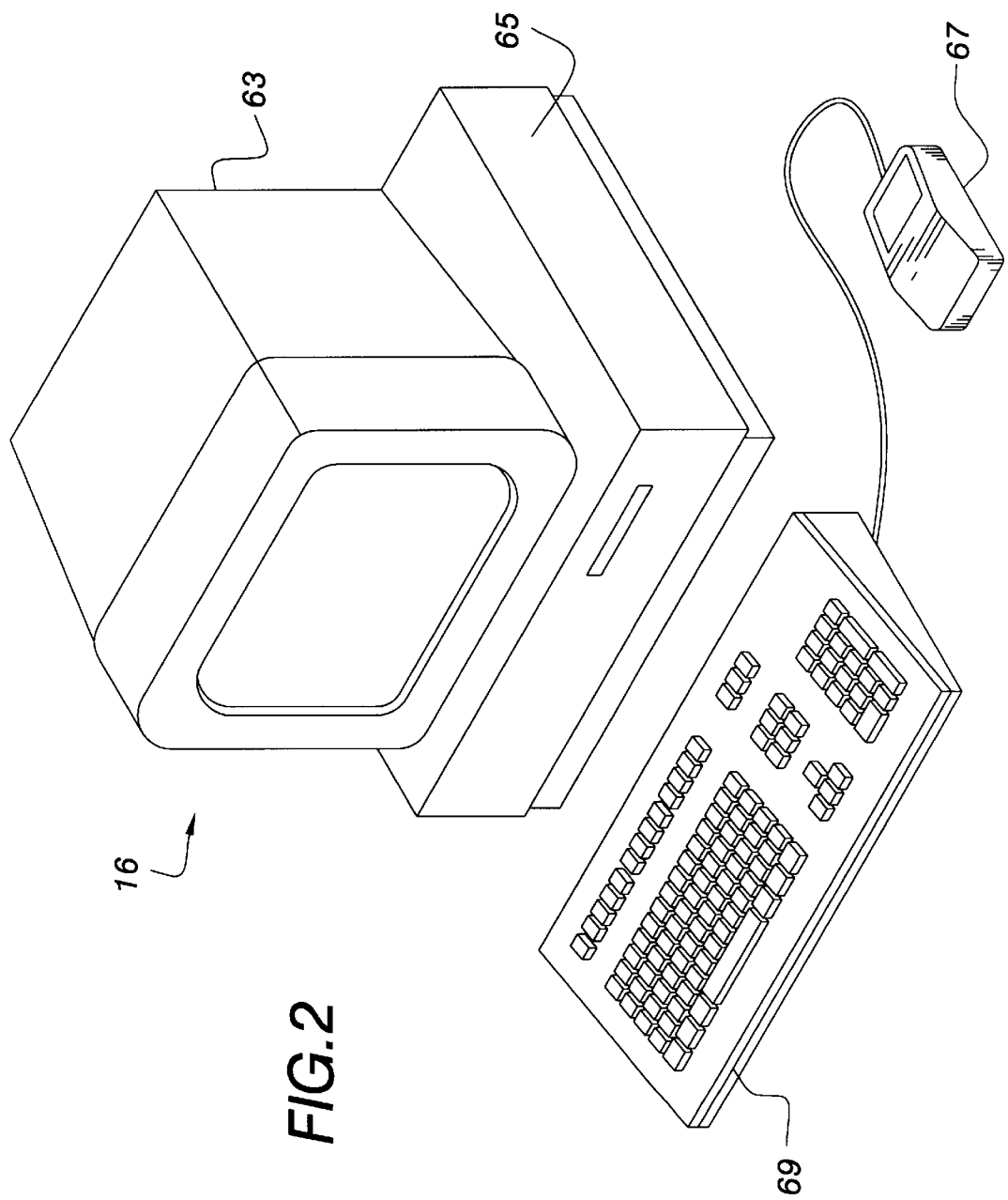
FIG. 2 is a view in perspective of an exemplary computer system implementing the console according to the present invention.

Console 16 is typically implemented by a conventional personal computer as illustrated in FIG. 2, however, other forms of computers, such as a Sun, Hewlett Packard, or IBM Unix workstation, may also be equipped and utilized as the console in substantially the same manner described below. Specifically, console 16 may be implemented by an IBM-compatible personal computer preferably equipped with a mouse 67, monitor 63, keyboard 69 and base 65. Base 65 commonly contains the processors, memory and communications resources, such as internal/external modems or other communications cards for the console. The console includes software for analyzing the data collected by the probe and displaying the information to an operator as described below. Further, the console utilizes short term and long term databases to maintain data for extended periods of time. The databases may be implemented by any conventional or commercially available database. Console 16 typically includes at a minimum an Intel 80486 or equivalent processor with substantial RAM in order to effectively execute the software, however, a pentium or equivalent processor with 16 megabytes of RAM is preferable. The console may operate as a stand-alone console coupled to the probe, or in a client/server configuration wherein a server (i.e., a computer system as described above preferably utilizing a windows NT environment) performs substantial interactions with the probe and conveys probe information to its clients (i.e., computer systems as described above preferably utilizing a Windows 95 NT or Unix environment). The clients may also communicate with the probe directly for the data collection requests and for providing configuration parameters to the probe as described below.

Figure 3:
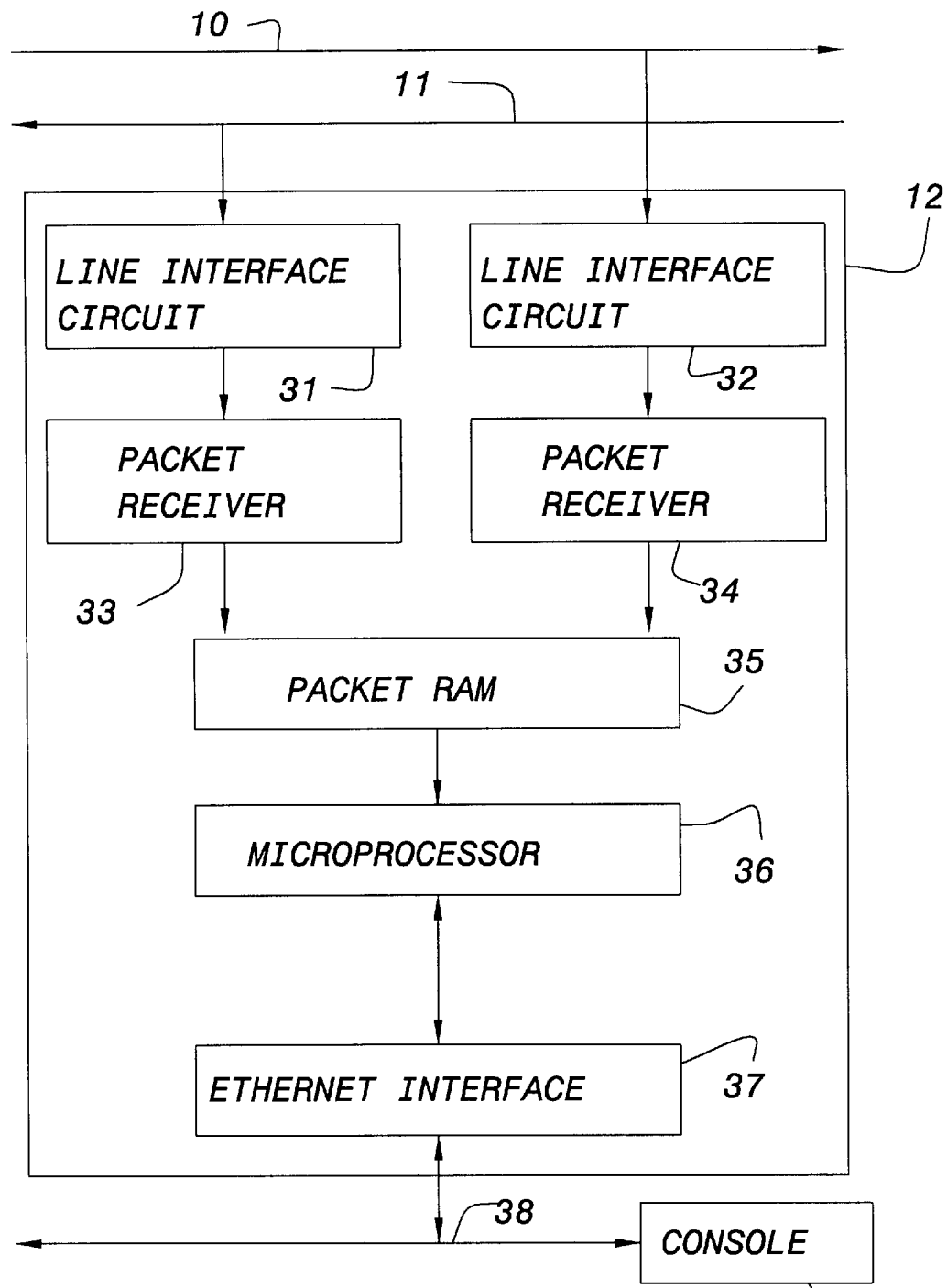
FIG. 3 is a schematic block diagram of a typical probe utilized for monitoring the data transmission system according to the present invention.

Probe 12 is a passive monitoring device and is preferably implemented by a Simple Network Monitoring Protocol (SNMP) remote monitoring probe. These probes commonly include free-running counters that increment for each occurrence of a particular event. The probe architecture is similar to the probe architecture disclosed in the aforementioned Ennis, Jr. et al patent (U.S. Pat. No. 5,521,907) and is illustrated in FIG. 3. Specifically, probe 12 includes line interface circuits 31, 32, packet receivers 33, 34, packet RAM 35, a microprocessor 36 and an ethernet interface 37. Line interface circuit 31 receives signals from communication line 11 and adapts the signals to standard digital logic levels for processing by packet receiver 33. Similarly, line interface circuit 32 receives signals from communication line 10 and adapts the signals to standard digital logic levels for processing by packet receiver 34. Packet receivers 33, 34 receive the adapted signals from line interface circuits 31, 32, respectively, and identify individual packets in the received data stream for copying and storage in packet RAM 35. Microprocessor 36 retrieves packets from packet RAM 35 and processes the packets to generate bandwidth utilization information as described below, while responding to any requests from console 16. The bandwidth utilization information is stored in internal microprocessor memory (not shown). When console 16 requests bandwidth utilization information from the probe, the information is released from microprocessor 36 to ethernet interface 37 wherein the data is manipulated to be compatible for transfer, preferably via an ethernet bus 38, to console 16. However, the data transfer from the probe to the console may be accomplished via other communication media.

The above described probe components are preferably all conventional and commercially available. For example, the preferred embodiment utilizes a Level One LXT901PC as Ethernet Interface 37; a Motorola MC68EN360RC25 as microprocessor 36 and packet receivers 33, 34 (i.e., a single microprocessor chip functions as both the microprocessor and packet receivers); a Texas Instruments TM124BBK32-60 or equivalent DRAM SIMM as Packet RAM 35; and an Advanced Micro Devices AM26LS32PC or equivalent line receivers as Line Interface circuits 31, 32. It is to be understood that any other components performing substantially the same functions may be utilized in substantially the same manner described above to realize the probe.

Generally, data transmission system activity, and in particular system traffic bursts (i.e., sudden surges or peaks in system utilization), endure for short periods of time. In order to appropriately capture data transmission system activity, the probe must have a sampling interval of sufficiently short duration to collect information relating to the system utilization and bursts. In addition, since the console displays the access channel and individual circuit utilization information in graphical form as described below, a large sample base is required to provide sufficient granularity to discern bursts within the utilization data. However, the probe includes limited memory resources that can be exhausted when the probe monitors the data transmission system for extended periods of time. For example, a probe having a sampling interval of one second accumulates nine-hundred measurements for a fifteen minute interval (i.e., sixty samples per minute multiplied by fifteen minutes). In order to reduce the storage requirements for the data transmission system information while enabling the probe to collect a sufficient sample base for graphical display, the probe utilizes a series of counters to collect and represent access channel and individual circuit utilization information. The probe sampling interval is preferably set for one second wherein the probe measures data transmission system activity. The sampling interval may be designated to be any time interval capable of supplying a sufficient sample base (i.e., sufficient number of data points) to the console for graphical display.

Initially, an operator enters information into console 16 describing the data transmission system configuration including the individual circuits to monitor. The probe typically determines the bandwidth capacities and committed information rates (i.e., bandwidth allocated to a circuit as described below) for the access channel and individual circuits, respectively, however, the operator may override this determination and enter the bandwidth capacities and committed information rates into the console. Further, the operator enters information into console 16 to enable the probe to determine the circuit routing and destinations for analyzed packets traveling on the data transmission system (e.g., typically addresses and other parameters). Basically, the packets include an address or other identifier corresponding to the circuit routing and packet destination. Packet switches forward each packet according to the address and routing information. Since data streams are likely to contain packets for different destinations, the present invention filters the packets based on circuit routing and destination address to collect data transmission system information relating to the access channel and individual circuits. The console transfers various parameters to the probe and configures the probe for proper monitoring operation. The probe captures packets from the data transmission system and deposits them in packet RAM 35 (FIG. 3) as described above. Since the console displays information relating to bandwidth utilization for individual circuits, microprocessor 36 utilizes the parameters transmitted from the console to identify the circuit traversed by a particular packet. Further, since the console displays bandwidth utilization for data traveling "to" and "from" the switching network as described below, microprocessor 36 determines the data direction based on the communication line with which the probe receives a packet. For example, packets received by the probe on communication line 10 (FIG. 1) indicate data going "to the switching network", while packets received by the probe on communication line 11 indicate data going "from the switching network". Microprocessor 36 retrieves the captured packets from packet RAM 35 for each sampling interval and filters the packets to associate the packets with the proper access channel or individual circuit information. Microprocessor 36 determines the number of bits transferred in each direction (i.e., to and from the switching network) over the access channel and on each individual circuit (i.e., to the switching network) during the one second sampling interval. The measured bit information is utilized to increment specific counters within the probe as described below.

Once the probe measures data transmission system activity during a sampling interval, the system activity information is typically processed while the probe collects information for the subsequent sampling interval. The probe processes the sampled data in "real time", typically within milliseconds after receiving the data. Microprocessor 36 utilizes a series of counters in the microprocessor RAM to store the collected information. In particular, the counters represent different percentage ranges indicating the amount of bandwidth utilization for the access channel or an individual circuit. The access channel utilization is based on the aggregate utilization of the individual circuits associated with the channel and typically includes a fixed maximum bandwidth, while the individual circuits are usually allocated a fraction of the total circuit bandwidth referred to as the committed information rate (CIR). In other words, the committed information rate refers to a guaranteed bandwidth for sending data on a specific circuit. Microprocessor 36 preferably utilizes a series of five counters wherein a separate series of counters is utilized to individually maintain data transmission system activity information for data traveling in each direction on the access channel (i.e., a separate series of counters maintains information for data going to the switching network and data going from the switching network) and for each individual circuit (i.e., for data going to the switching network). The counters within each series maintaining utilization information for the access channel for data traveling to and from the switching network, respectively, are each associated with a different utilization percentage range within an overall range of 0%–100%. In particular, each counter from a series corresponds to one of the utilization percentage ranges of 0%–10%, 11%–40%, 41%–60%, 61%–90% and 91%–100%, respectively. The counters within each series maintaining utilization information for circuit level utilization measurements are each associated with a different utilization percentage range extending from zero to greater than one hundred eighty percent. In particular, each counter from a series corresponds to one of the utilization percentage ranges of 0%–20%, 21%–80%, 81%–120%, 121%–180% and greater than 180% (i.e., >180%), respectively. The access channel utilization is measured against a fixed maximum bandwidth as described above, and therefore the overall percentage range associated with the counters is 0%–100% However, since the individual circuits utilize a portion of the circuit bandwidth capacity, the circuits may transfer data at rates in excess of one-hundred percent of the allocated bandwidth or committed information rate. Therefore, the individual circuits require percentage ranges exceeding one-hundred percent. When an individual circuit transfers data at rates that exceed one-hundred percent of the committed information rate, there is a risk that the additional data may not be transferred, thereby degrading performance since the information may need to be retransmitted. The counters are incremented after each sampling interval based on the measured utilization of the access channel and individual circuits as described below. The counters convey the amount of time the access channel or circuit is operating within the corresponding utilization percentage range, thereby indicating high or low utilization for a particular time interval. It is to be understood that the present invention may utilize any number of counters representing any desired percentage ranges capable of conveying the data transmission system activity information.

Figure 4:
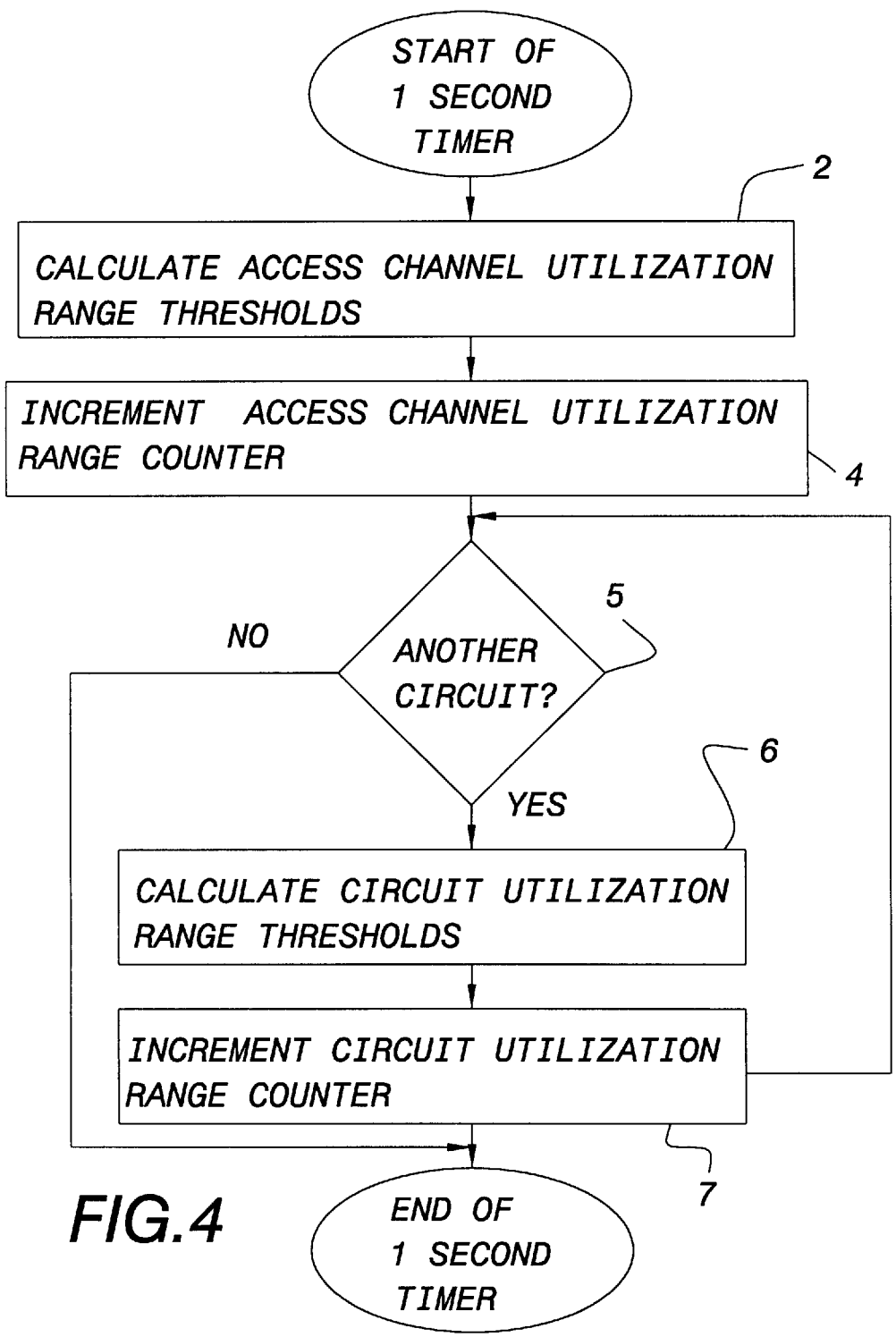
FIGS. 4–8 are procedural flow charts illustrating the manner in which the probe determines bandwidth utilization for the access channel (i.e., access channel utilization) and individual circuits (i.e., circuit level utilization) by determining range thresholds and incrementing appropriate utilization percentage range counters according to the present invention.
Figure 5:
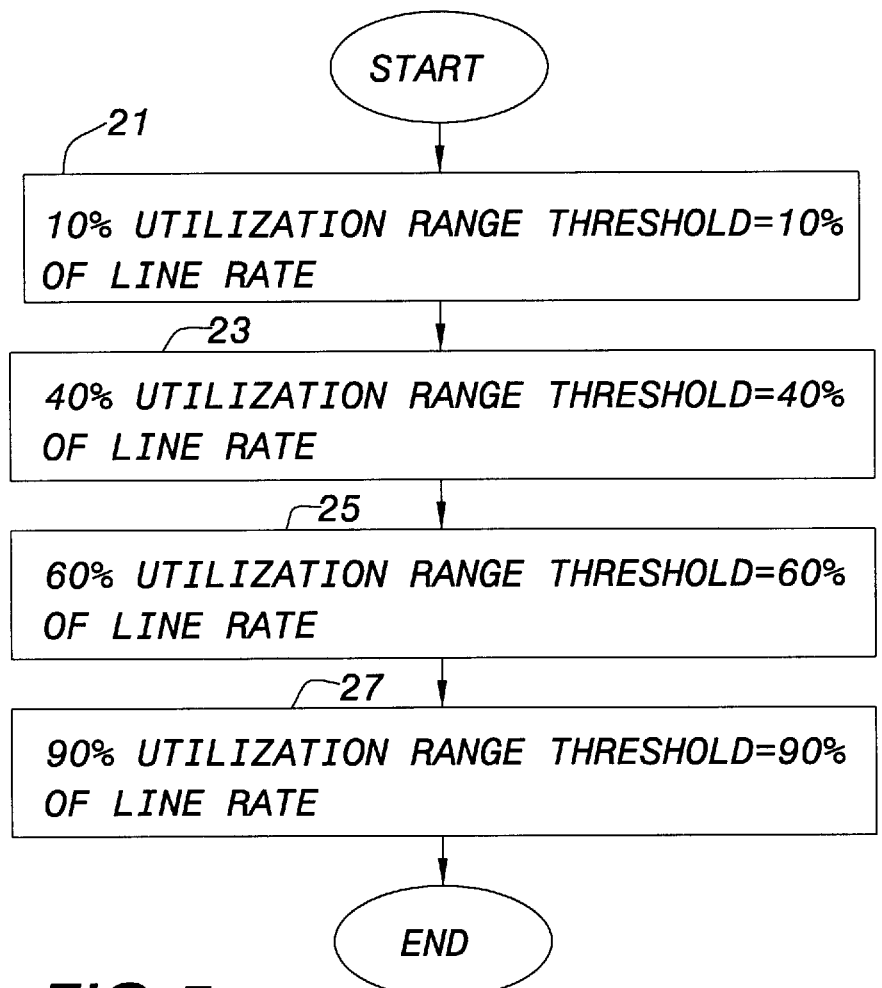

The manner in which the probe determines the appropriate counter to increment is illustrated in FIGS. 4–8. Initially, after the probe collects data during a sampling interval, microprocessor 36 (FIG. 3) retrieves and filters the packets from packet RAM 35 as described above. Specifically, the microprocessor determines the increment thresholds at step 2 for the series of utilization percentage counters that maintains information for the access channel utilization for data traveling in each direction to and from the switching network. The increment thresholds for the counters are determined as illustrated in FIG. 5. In particular, microprocessor 36 sets the increment threshold for the respective 0–10% range counters associated with each direction to ten percent of the fixed access channel bandwidth at step 21. The increment threshold for the respective 11–40% range counters associated with each direction is set to forty percent of the fixed access channel bandwidth at step 23. Similarly, the increment threshold for the respective 41–60% range counters associated with each direction is set to sixty percent of the fixed access channel bandwidth at step 25, while the increment threshold for the respective 61%–90% range counters associated with each direction is set to ninety percent of the fixed access channel bandwidth at step 27. The bandwidth for the access channel is determined by the configuration of the equipment providing the access channel and may be measured by the probe. Alternatively, the access channel bandwidth may be entered at console 16 as a parameter and downloaded to the probe as described above to enable the probe to calculate the increment thresholds. The increment thresholds are utilized to determine the appropriate counter to increment as described below. The thresholds indicate the number of bits required to be transferred during a sampling interval to attain the corresponding bandwidth utilization percentage.

Figure 6:
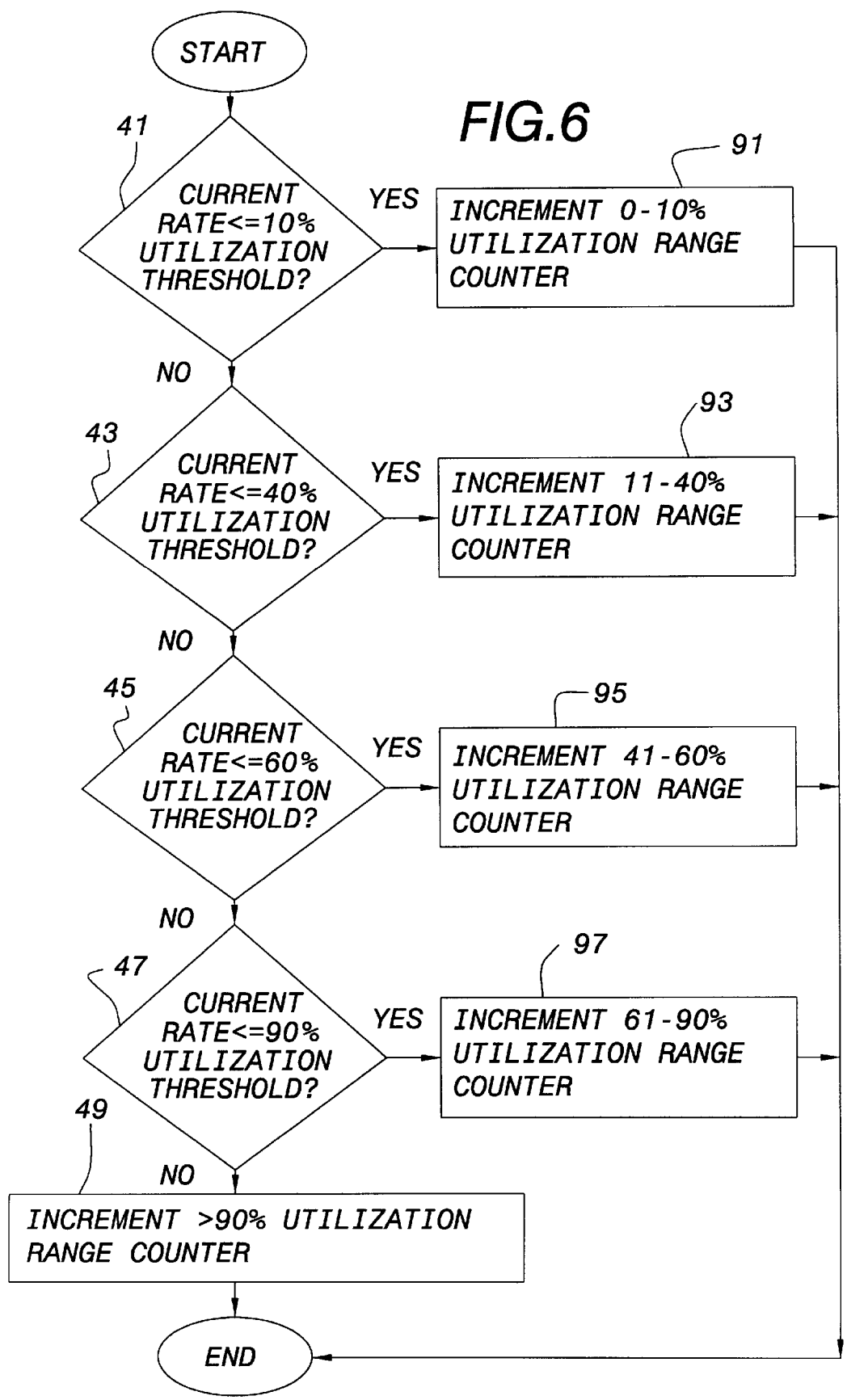

Referring back to FIG. 4, after the increment thresholds are calculated at step 2, microprocessor 36 determines the total of data bits transferred (i.e., the total bit count does not include filler patterns that pad between data packets) over the access channel in each direction (i.e., to and from the switching network) during the sampling interval based on information in the captured packets. The number of transferred bits in combination with the increment thresholds are utilized to increment the counters associated with the appropriate bandwidth utilization percent range as illustrated in FIG. 6. The process for incrementing the appropriate counters is performed for data traveling in each direction to and from the switching network as described below. Specifically, the number of bits transferred for a particular direction is compared at step 41 to the increment threshold for the 0–10% counter. When the number of transferred bits is less than or equal to the increment threshold, the corresponding 0–10% counter is incremented at step 91. When the number of transferred bits exceeds the increment threshold for the 0–10% counter, the transferred bit count is compared at step 43 to the increment threshold for 11–40% counter wherein the 11–40% counter is incremented at step 93 if the number of transferred bits is less than or equal to the increment threshold for the 11–40% counter. Similarly, when the number of transferred bits exceeds the increment threshold for the 11–40% counter, the number of transferred bits is compared at step 45 to the increment threshold for the 41–60% counter wherein the 41–60% counter is incremented at step 95 if the number of transferred bits is less than or equal to the increment threshold for the 41–60% counter. When the number of transferred bits exceeds the increment threshold for the 41–60% counter, the number of transferred bits is compared at step 47 to the increment threshold for the 61–90% counter wherein the 61–90% counter is incremented at step 97 if the number of transferred bits is less than or equal to the increment threshold for the 61–90% counter. When the number of transferred bits exceeds the increment threshold for the 61–90% counter, the 91–100% counter is incremented at step 49. In other words, the number of transferred bits is compared to the increment thresholds of the counters in ascending order until reaching an increment threshold greater than the number of transferred bits wherein the appropriate counter corresponding to that increment threshold is incremented.

Once the access channel utilization counters for each direction (i.e., to and from the switching network) have been updated, microprocessor 36 performs a similar counter update process for the individual circuits associated with the access channel and specified for monitoring as described above having an allotted bandwidth or committed information rate. With reference to FIG. 4, microprocessor 36 determines at step 5 whether or not the individual circuits have been processed. When the individual circuits have not been processed, microprocessor 36 determines increment thresholds for the counters at step 6 and increments a corresponding counter at step 7 in substantially the same manner described above for the access channel utilization except that the utilization counters for the individual circuit correspond to different percentage ranges. The probe collects data traveling to the switching network for individual circuits and therefore only determines thresholds and increments counters for a single direction (i.e., unless a second probe is utilized at the other end of a circuit as described below).

Figure 7:
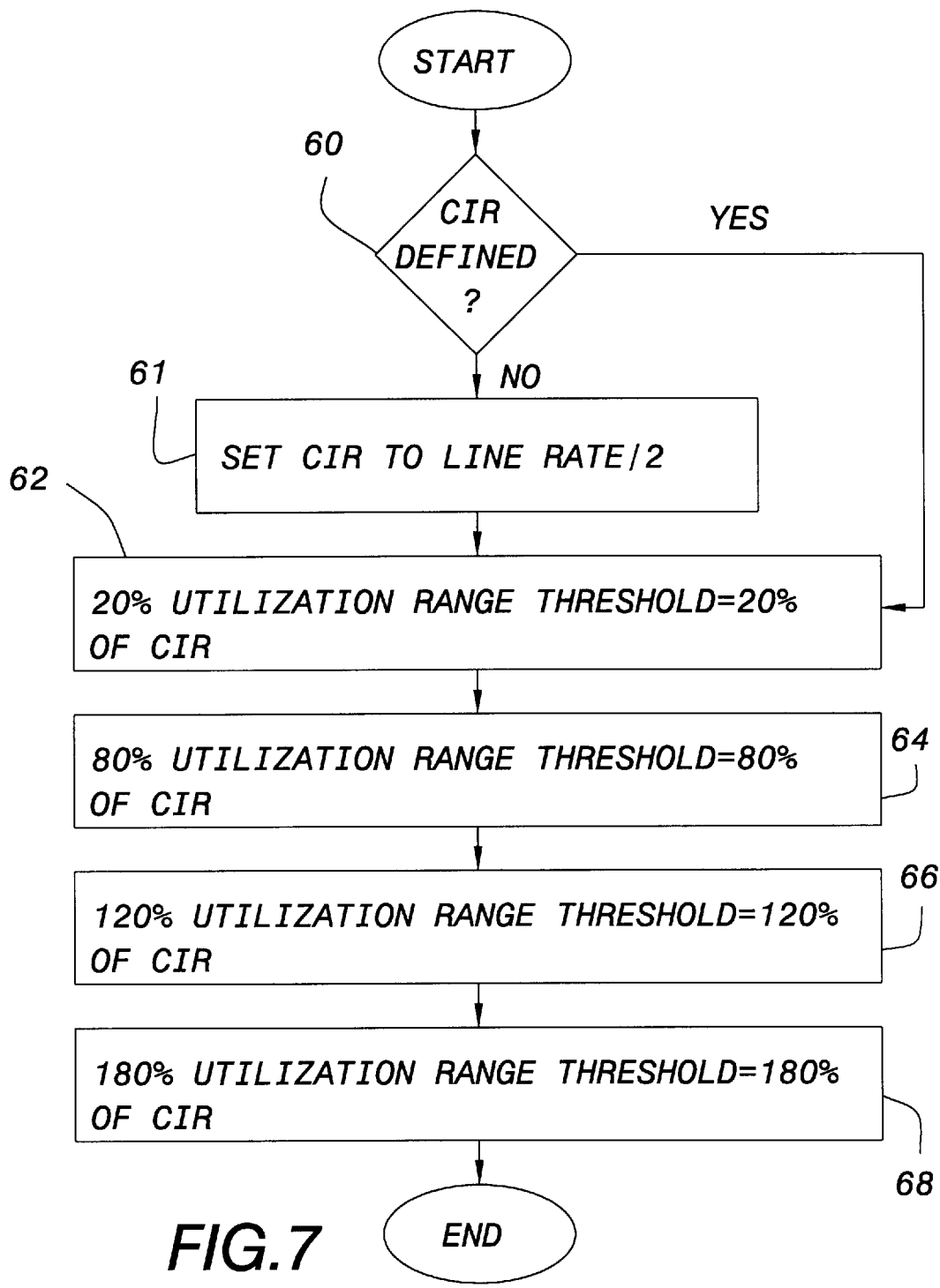

The manner in which the increment thresholds are determined for counters associated with individual circuits is illustrated in FIG. 7. Generally, individual circuits utilize only a portion of the total circuit bandwidth and transfer data at a committed information rate as described above. The committed information rate is typically determined by the probe from link management packets periodically traversing the data transmission system containing the committed information rate in substantially the same manner described above for the access channel bandwidth. Alternatively, the committed information rate may be entered at console 16 and downloaded to the probe as described above. Specifically, the microprocessor determines at step 60 whether or not the committed information rate is available. When the committed information rate is not available, the microprocessor assumes at step 61 that the committed information rate is one half the access channel rate. Once the committed information rate is ascertained, the microprocessor sets the increment thresholds for the counters. In particular, the increment threshold for the 0–20% counter is set to twenty percent of the committed information rate at step 62; the increment threshold for the 21–80% counter is set to eighty percent of the committed information rate at step 64; the increment threshold for the 81–120% counter is set to one-hundred twenty percent of the committed information rate at step 66; and the increment threshold for the 121–180% counter is set to one-hundred eighty percent of the committed information rate at step 68. The thresholds indicate the number of bits required to be transferred to attain the corresponding utilization percentage as described above.

Figure 8:
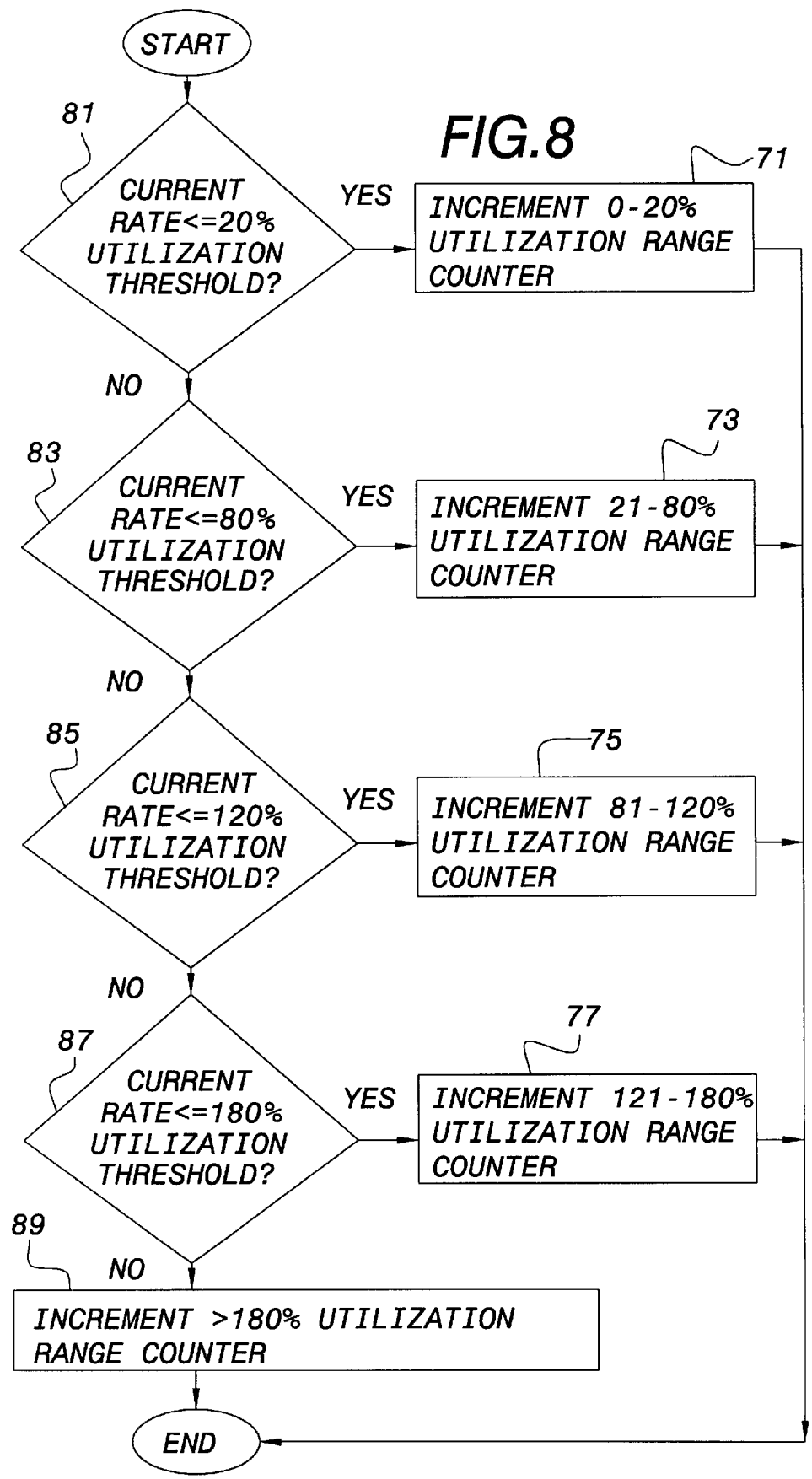

Subsequent to the increment threshold calculations, a corresponding counter representing the utilization percentage range measured during the sampling interval is incremented as illustrated in FIG. 8. Initially, the microprocessor determines the total number of bits transferred over the individual circuit to the switching network during they sampling interval based on the information in the captured packets as described above. Specifically, the number of transferred bits for the individual circuit is compared at step 81 to the increment threshold for the 0–20% counter wherein the 0–20% counter is incremented at step 71 if the number of transferred bits is less than or equal to the increment threshold for the 0–20% counter. When the number of transferred bits exceeds the increment threshold for the 0–20% counter, the number of transferred bits is compared at step 83 to the increment threshold for the 21–80% counter wherein the 21–80% counter is incremented at step 73 if the number of transferred bits is less than or equal to the increment threshold for the 21–80% counter. When the number of transferred bits exceeds the increment threshold for the 21–80% counter, the number of transferred bits is compared at step 85 to the increment threshold for the 81–120% counter wherein the 81–120% counter is incremented at step 75 if the number of transferred bits is less than or equal to the increment threshold for the 81–120% counter. When the number of transferred bits exceeds the increment threshold for the 81–120% counter, the number of transferred bits is compared at step 87 to the increment threshold for the 121–180% counter wherein the 121–180% counter is incremented at step 77 if the number of transferred bits is less than or equal to the increment threshold for the 121–180% counter. When the number of transferred bits exceeds the increment threshold for the 121–180% counter, a greater than 180% counter is incremented at step 89 and the microprocessor returns to process any remaining circuits.

Referring back to FIG. 4, after processing the individual circuit, microprocessor 36 determines at step 5 whether or not further circuits require processing, and repeats the counter incrementing process described above for the remaining circuits waiting to be processed. When all circuits are processed, data from the next sampling interval is utilized to increment the access channel and circuit counters as described above. The counters are repeatedly incremented at each sampling interval as described above for fifteen minute periods wherein at the end of each period the counts are stored in the microprocessor memory and the counters are reset. In this fashion, a small series of counts contains utilization information for a fifteen minute interval, thereby reducing storage requirements of the sample base. The period for storage and resetting of the counters may be set to any desired interval accommodating the probe's limited storage requirements.

Figure 9:
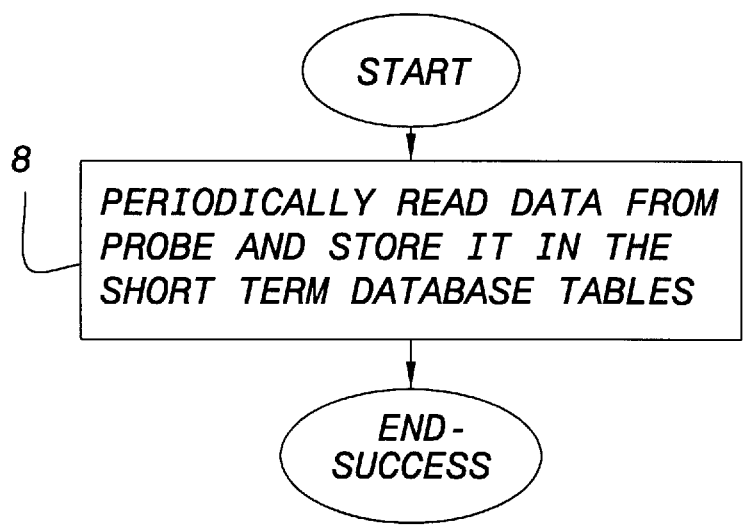
FIG. 9 is a procedural flow chart illustrating the manner in which the console retrieves data from the probe and stores the data in short term database tables according to the present invention.
Figure 10:
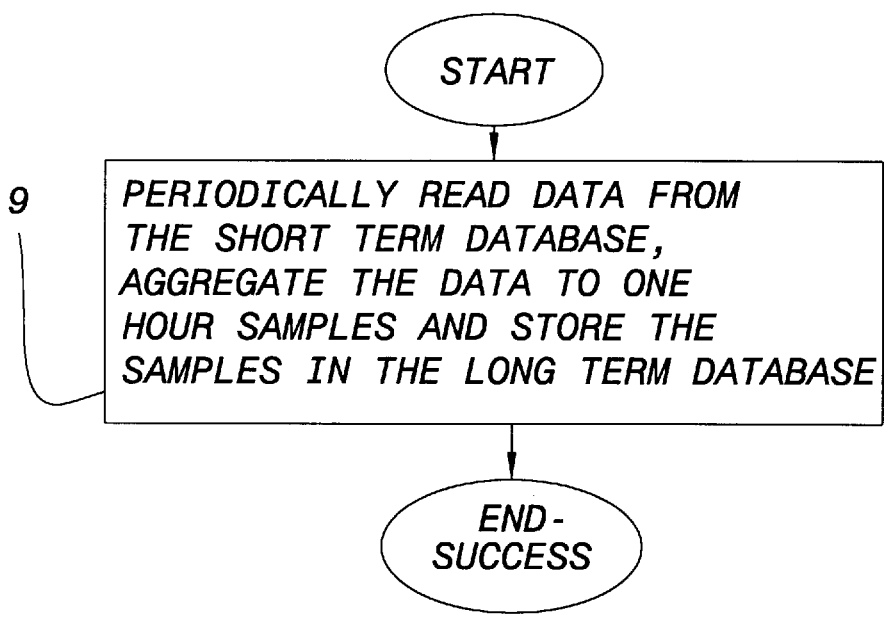
FIG. 10 is a procedural flow chart illustrating the manner in which the console transfers data from the short term database to a long term database according to the present invention.

Console 16 is typically utilized by an operator to retrieve the analysis results from the probe and store the data in short and long term databases as illustrated in FIGS. 9–10. Initially, data from the probe is transferred to console 16 via secondary communications between the console and probe, such as ethernet bus 38 (FIG. 3). An operator can schedule the console to retrieve data from the probe daily at a specified time, each hour, or not at all. Further, an operator can manually command the console to retrieve data from the probe at anytime, or the console automatically collects the appropriate data to satisfy any display requests for a specified time period. The data retrieved by the console from the probe is initially stored in short term database tables at step 8 (FIG. 9) for display on troubleshooting screens as described below. The console further aggregates or compresses data from the short term database tables as described below and transfers the aggregated data to a long term database at step 9 (FIG. 10) to permit recently sampled data to be placed in the short term database. The data from the short term database typically includes the counts from the utilization percentage range counters during fifteen minute intervals as described above. However, the counts of each of the respective counters are added to determine total counts for each respective counter indicating the percentage utilization for the access channel or individual circuit during a sixty minute or hour interval. In other words, four fifteen minute interval counts for each respective percentage counter are added to determine the count totals for an hour interval. The hour count total for each respective counter is stored in the long term database, thereby compressing the data (i.e., storing one count in the long term database for every four counts in the short term database) and yielding sufficient granularity (i.e., sufficient amount of data points) for analysis over extended periods of time. The operator may specify a time for the daily occurrence of the database transfer from the short term to the long term database, or may command the console to immediately transfer the data. The long term database information is typically utilized for printed reports containing information spanning extensive periods of time, such as a day or a month.

Figure 11:
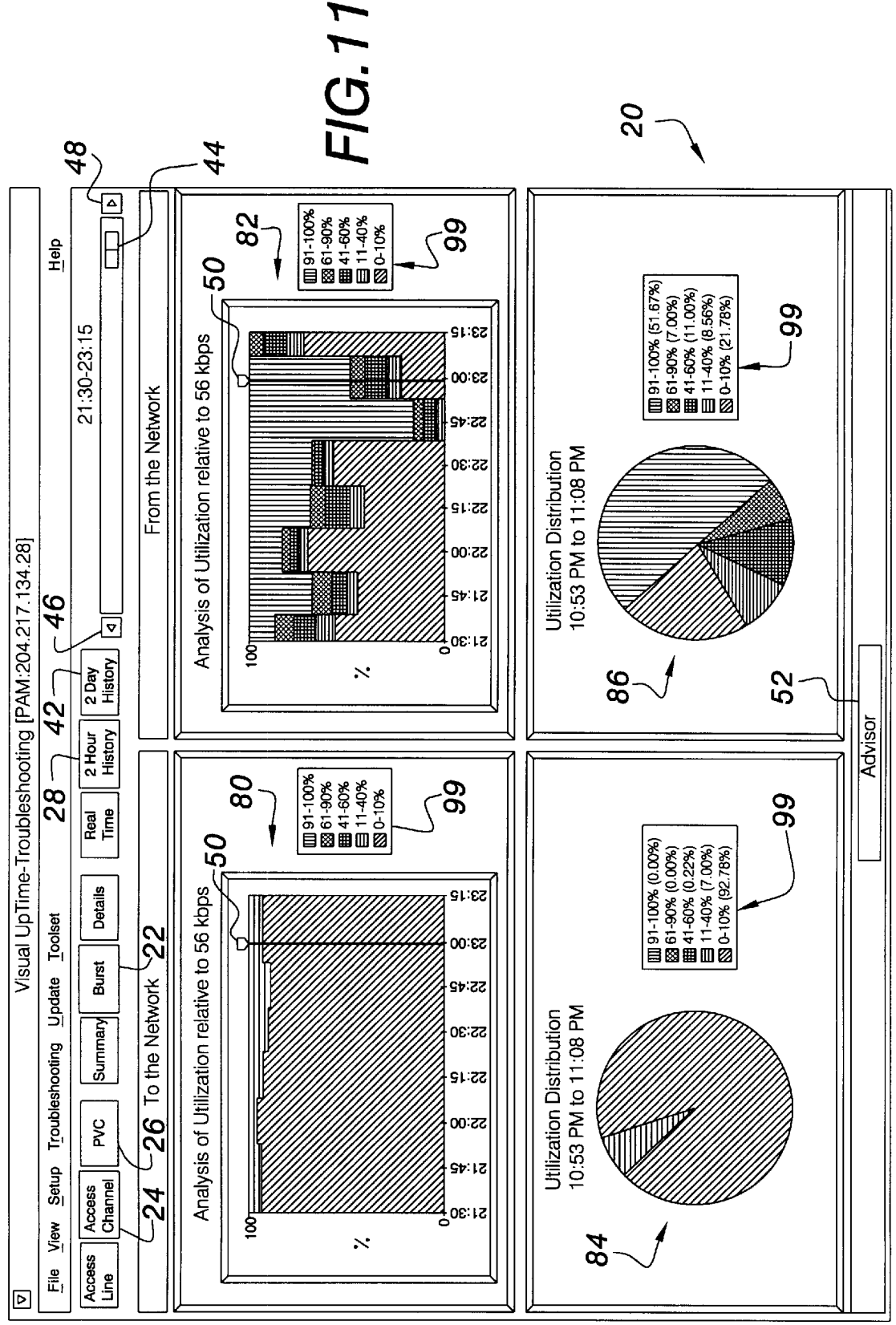
FIG. 11 is a schematic illustration of an exemplary console graphical user screen displaying the access channel bandwidth utilization (i.e., access channel utilization) for a two hour history according to the present invention.

Console 16 displays a conventional graphical user interface or window enabling the operator to initiate access channel and/or individual circuit bandwidth utilization analysis as illustrated in FIG. 11. The window may be arranged in any fashion and contain any data transmission system related or other information. The window may contain only the data transmission system analysis and report functions, or include any other functions pertinent to the analysis, such as help, tools, view, etc. Specifically, window 20 includes burst tool bar 22, access channel and PVC tool bars 24, 26 and two hour and two day history tool bars 28, 42. The PVC circuit level analysis is utilized by way of example wherein information for other circuits may be displayed in substantially the same manner described below. Window 20 typically includes several pull down menus located toward the top of the window, such as File, View, Setup, Troubleshooting, Update, Toolset and Help, for initiating various functions. The operation of pull down menus via a mouse is conventional and well known in the computer arts. Further, window 20 includes a sliding bar 44 manipulable by mouse 67 (FIG. 2) to select a desired time interval for viewing. The bar may be moved by directly placing the cursor on the bar via the mouse, and dragging the bar (i.e., maintaining the left mouse button in a depressed state and moving the mouse in a desired direction) to a location indicating the desired time interval to view. In addition, bar 44 is disposed between left and right arrows 46, 48 that may be manipulated via mouse 67 to move the bar in a desired direction (i.e., placing the cursor on an arrow and depressing and releasing the left mouse button (i.e., clicking) moves slide bar 44 in the corresponding direction) to select a time interval. The time interval indicated by the bar position is displayed above the bar. By way of example only, window 20 further displays access channel bandwidth utilization in the form of bar graphs 80, 82 for data traveling to and from the switching network, respectively, for the selected interval as described below. The bar graphs include labels indicating the direction being displayed and the access channel bandwidth, and a bar graph key 99 showing codes for the utilization percentages associated with the probe counters described below. A pointer 50 is manipulable via mouse 67 along the bar graph horizontal axis to select a particular fifteen minute interval for which a corresponding pie chart 84, 86 is generated as described below. The pie chart is displayed directly below the bar graph from which the fifteen minute interval is selected, and includes a label indicating the actual time of day the selected interval represents. The pie chart further includes a pie chart key 99 showing the codes for the utilization percentages associated with the probe counters and the percentage of the pie chart coded by each code. In addition, window 20 includes advisor button 52 for initiating analysis of the access channel and/or individual circuit utilization data to recommend a bandwidth adjustment.

Figure 12:
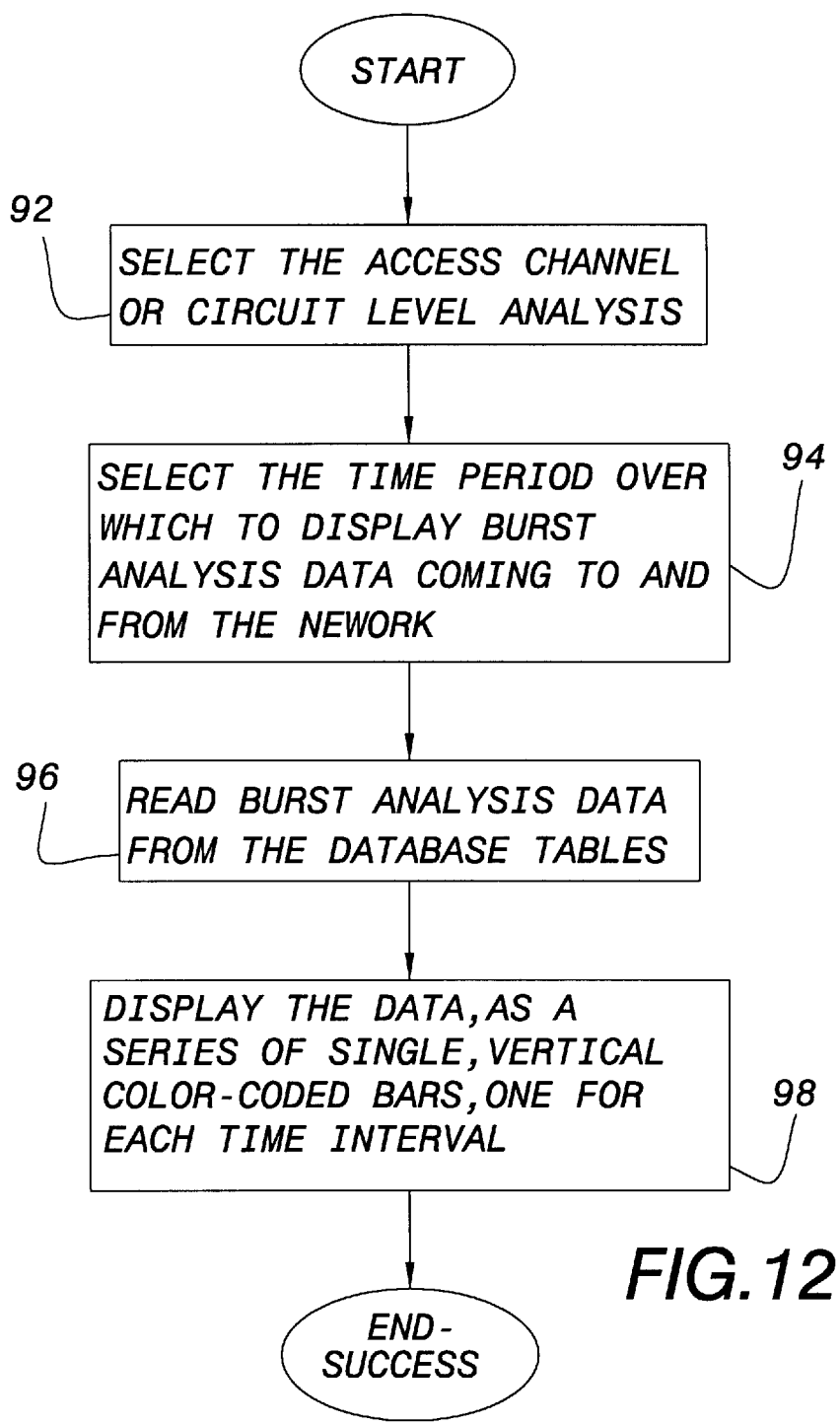
FIG. 12 is a procedural flow chart illustrating the manner in which access channel or individual circuit bandwidth utilization information is displayed by the console according to the present invention.

Operation of the console is now described with reference to FIGS. 11–12. Specifically, console 16 is initiated and commanded to execute the monitoring software. Executing software on console 16 is well known in the computer art. Console 16 displays window 20 wherein access channel and/or individual circuit bandwidth utilization analysis is initiated from the troubleshooting pull down menu described above. The operator selects at step 92 either the access channel (i.e., bandwidth for all circuits) or circuit level (e.g., an individual virtual circuit) bandwidth utilization to view by clicking on tool bar 24 or 26, respectively. After selecting the utilization to view, the operator selects at step 94 either a two day or two hour history via tool bar buttons 28, 42, respectively, and subsequently manipulates slide bar 44 via mouse 67 as described above to select the date and time of the interval for display. The operator clicks on burst toolbar button 22 to select bandwidth utilization analysis, and once all the above-described selections are made, console 16 retrieves the appropriate probe data from the short term database tables at step 96 and manipulates the data to generate at step 98 bar graphs 80, 82 described below. The operator may select a fifteen minute interval from the bar graph by manipulating pointer 50 such that console 16 generates a pie chart 84, 86 corresponding to that interval described below.

Figure 13:
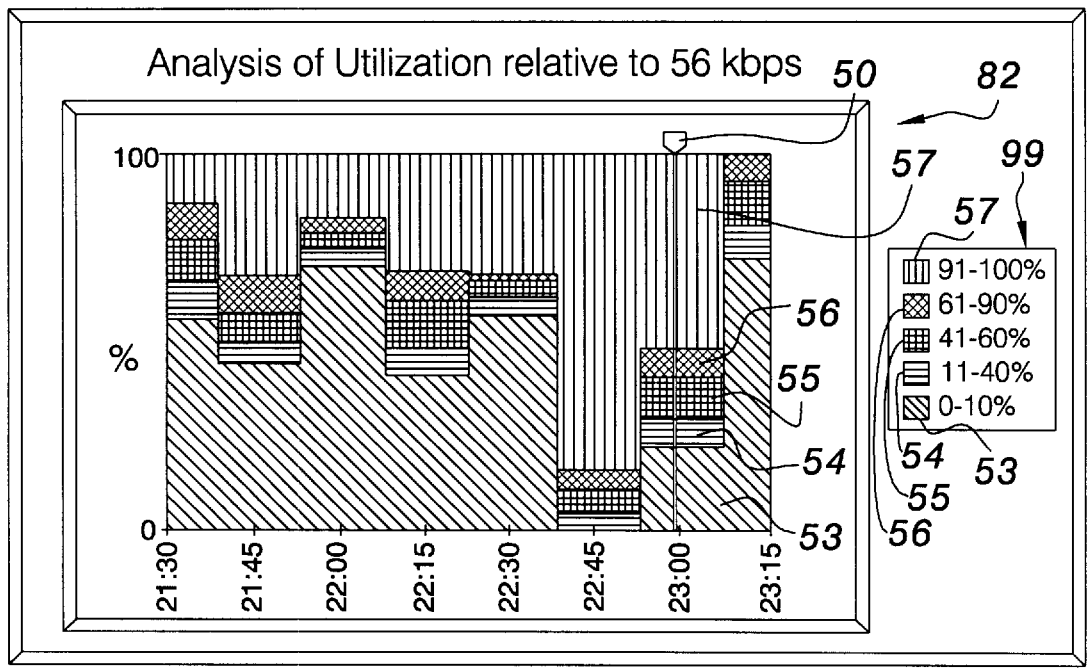
FIG. 13 is a schematic illustration of a portion of the exemplary console graphical user screen of FIG. 11 displaying a bar graph indicating the access channel bandwidth utilization for a two hour history according to the present invention.

Console 16 manipulates the data retrieved from the probe in order to display the information in graphical form. In particular, the console receives the counts of all the utilization percentage range counters from the probe for each fifteen minute interval. The counters are typically reset by the probe after every fifteen minute interval to maintain utilization information in fifteen minute increments as described above. Each counter corresponds to the number of seconds the access channel or individual circuit utilizes the percentage of bandwidth indicated by the bandwidth utilization percentage range associated with that counter. Console 16 preferably color codes each bar graph to indicate the percentage of bandwidth utilization during a specific interval. An exemplary bar graph showing access channel bandwidth utilization for data traveling from the switching network is illustrated in FIG. 13, however, the bar graph showing access channel utilization for data traveling to the switching network is generated, and functions, in a substantially similar manner. Specifically, bar graph 82 displays the access channel bandwidth utilization for data traveling from the switching network over a selected two hour period. The bar graph includes a horizontal axis extending over a two hour period partitioned into fifteen minute intervals. The vertical axis extends from zero to one hundred percent and indicates the percentage of seconds within each fifteen minute interval on the horizontal axis. Alternatively, the vertical axis may extend from zero to nine hundred seconds to indicate the number of seconds within each fifteen minute interval on the horizontal axis and display utilization information in substantially the same manner described below. The utilization percentage ranges associated with the probe counters are displayed in a key 99 indicating the codes 53, 54, 55, 56 and 57 utilized by the bar graph to show the various bandwidth percentage utilizations. Console 16 retrieves the counts from the short term database wherein the counts indicate the amount of time (i.e., number of seconds since the sampling interval is one second) within the fifteen minute interval that the access channel utilization was at a particular utilization percentage range. Consequently, console 16 displays a vertical bar for each fifteen minute interval on the horizontal axis spanning the vertical axis from zero to one hundred percent. Each vertical bar includes a series of vertically concatenated coded bars wherein the height of each concatenated bar within the vertical bar designates the percentage or amount of time within the interval that access channel bandwidth utilization is within a particular percentage range. The amount of time the access channel utilization is within a particular percentage range is directly proportional to the count of the counter corresponding to that range. Each concatenated bar is coded in accordance with key 99 to indicate the bandwidth utilization percentage that the concatenated bar represents such that for each fifteen minute interval along the horizontal axis, the access channel bandwidth utilization is easily discernable based on the codes of the concatenated bars. For example, the fifteen minute interval starting approximately at 22:52 and ending at 22:07 has an access channel bandwidth utilization predominately in the 91%–100% range based on the height of the concatenated bar coded utilizing code 57 to indicate the 91%–100% range. Typically, the shades from green to yellow represent codes 53–55 (i.e., 0–60%), while the shades from yellow to red represent codes 55–57 (i.e., 41–100%), however, any color scheme or other indicia may be utilized to distinguish the percentage ranges.

Figure 14:
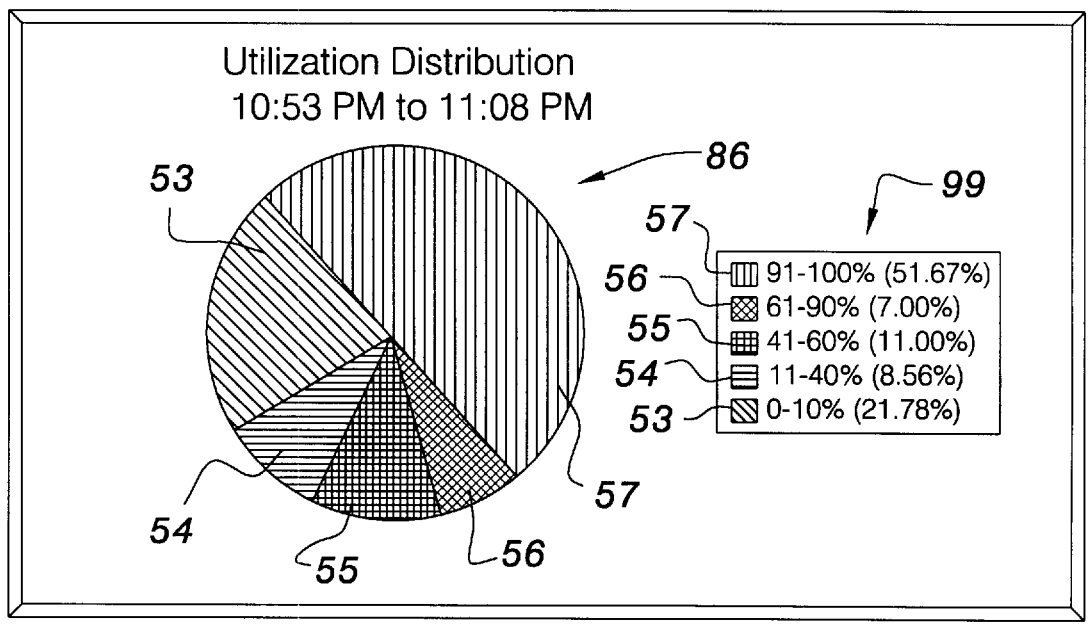
FIG. 14 is a schematic illustration of a portion of the exemplary console graphical user screen of FIG. 11 displaying a pie chart indicating the access channel bandwidth utilization for a fifteen minute interval selected from the bar graph of FIG. 13 according to the present invention.

Subsequent to displaying bar graph 82, pointer 50 may be manipulated via mouse 67 to isolate a specific fifteen minute interval and generate a pie chart 86 as illustrated in FIG. 14. Specifically, pie chart 86 is coded in accordance with key 99 based on access channel bandwidth utilization as described above. Key 99 includes substantially the same coding scheme described above for the bar graph and further indicates the proportion (i.e., percentage) that pie chart 86 is coded by each code. The value of each of the probe counters indicates the amount of time (i.e., seconds since the sampling interval is one second) within the selected fifteen minute interval that the bandwidth utilization was in the utilization percentage range associated with that counter and directly influences the proportion that pie chart 86 is coded with the corresponding code indicating that percentage range. For example, when the counter for the 91–100% (i.e., code 57) range attains a value of approximately 465, this indicates that the access channel was in the 91%–100% utilization range for approximately half the time of the fifteen minute interval (i.e., 465 is approximately half of the 900 seconds within the interval), thereby causing approximately half of the pie chart to be coded by corresponding code 57 indicating the 91%–100% range as illustrated in the figure. The other codes are utilized in the pie chart in a similar manner based on the percentage range counters associated with the other percentage ranges. The color scheme for the pie chart is substantially similar to the color scheme for the bar graph described above and may be any color scheme or other indicia capable of distinguishing the percentage ranges.

Figure 15:
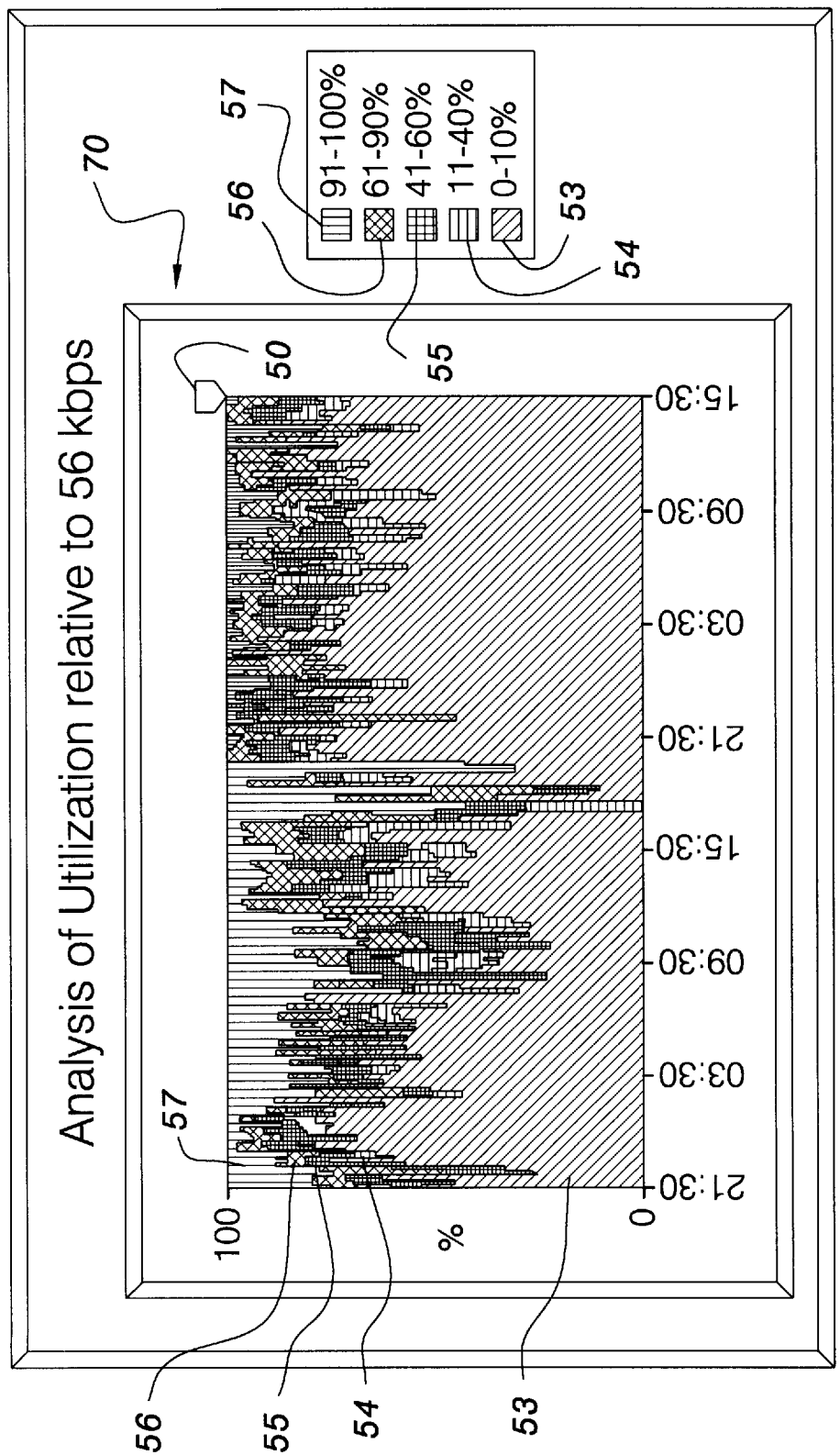
FIG. 15 is a schematic illustration of a portion of an exemplary console graphical user screen displaying a bar graph indicating the access channel bandwidth utilization (i.e., access channel utilization) for an approximate two day (i.e., forty-two hour) history according to the present invention.
Figure 16:
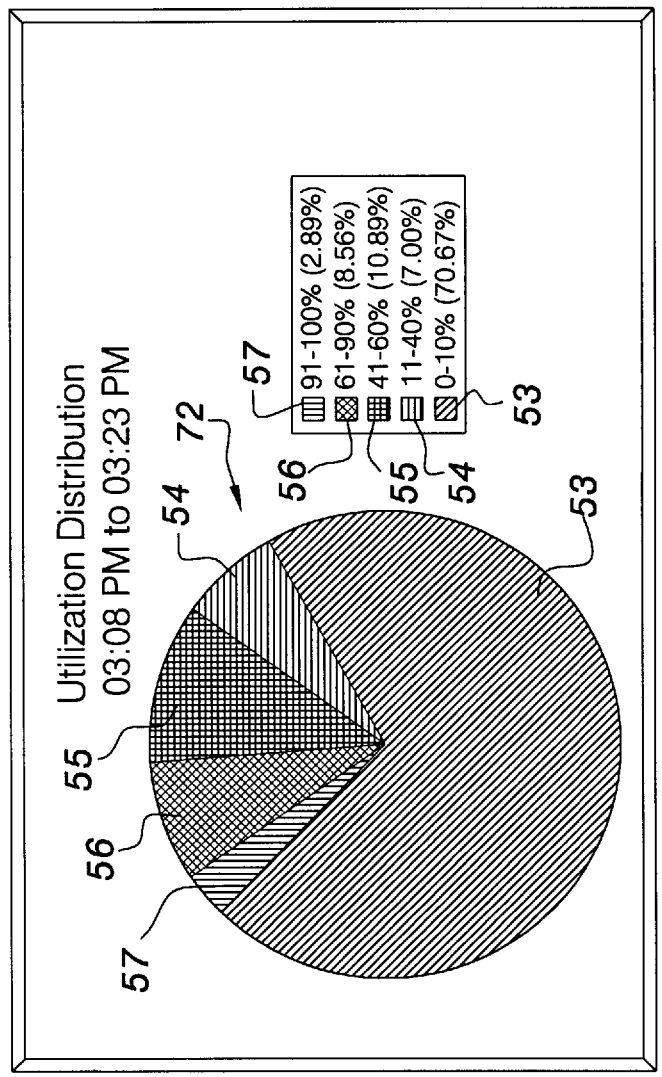
FIG. 16 is a schematic illustration of a portion of an exemplary console graphical user screen displaying a pie chart indicating the access channel bandwidth utilization (i.e., access channel utilization) for a fifteen minute interval selected from the bar graph of FIG. 15 according to the present invention.

A detailed view of a bar graph displaying data for an approximate two day period is illustrated in FIG. 15. The bar graph for a two day period is substantially similar to the bar graph described above for the two hour period except that the bar graph horizontal axis extends to indicate a two day period. Specifically, bar graph 70 includes a horizontal axis partitioned into six hour intervals extending for forty-two hours (i.e., approximately two days). The six hour intervals further include twenty-four fifteen minute intervals. Each fifteen minute interval includes a vertical bar having a series of vertically concatenated bars with each concatenated bar coded to designate an access channel bandwidth utilization percentage as described above. Further, pointer 50 may be manipulated along the horizontal axis to isolate a particular fifteen minute interval within the two day period for generation of a pie chart 72 in substantially the same manner described above. The generated pie chart is substantially similar to the pie chart generated above for the two hour time period and is illustrated in FIG. 16.

When an individual circuit is selected for viewing, the console displays a window substantially similar to window 20 described above. Specifically, the window includes a bar graph and pie chart that are substantially similar to the bar graph and pie chart described above except that the utilization percentage ranges indicated in the bar graph and pie chart keys reflect the committed information rate, or half the access channel rate when the committed information rate is not available, and extend from zero to greater than one hundred eighty percent. Since a probe captures data transmission system information for individual circuits in a single direction (i.e., to the switching network), only a single bar graph and pie chart are displayed on the window. However, when an additional probe is utilized at the other end of the circuit, the console processes that probe's data in substantially the same manner described above and displays a bar graph and pie chart corresponding to data traveling from that other end of the circuit or probe to the switching network. An operator specifies the circuit to view wherein each bar graph and pie chart includes labels indicating the circuit and the committed information rate for that circuit. Each bar graph and pie chart displays data in substantially the same manner described above utilizing codes to delineate the varying utilization percentage ranges. Typically, the color scheme employed in each bar graph and pie chart utilizes the shades from green to yellow for the range 0–120% and the shades from yellow to red for the range 81 to greater than 180%, however, any color scheme or other indicia capable of delineating the percentage ranges may be employed.

Once the bar graph and pie charts are displayed, an operator can view the bandwidth utilization to consider implementing adjustments. For example, a bar graph showing operation in the 0–10% range for a majority of the selected time samples indicates that additional applications, extra users, or increased communications can be enabled across the access channel or circuit without degrading performance. Further, when the bar graph and pie chart indicate low utilization, the bandwidth may be reduced, thereby reducing costs. Conversely, a bar graph showing bandwidth utilization predominantly in the 91–100% range indicates a highly utilized access channel or circuit that may require additional bandwidth. The console may recognize such periods of high utilization and issue an alarm and/or warning (e.g., audio, displayed warning, printed message etc.) notifying the operator of the condition. The bandwidth adjustments may be implemented in any conventional manner, preferably by the data transmission system provider, and typically require reconfiguration of the data transmission system.

Figure 17:
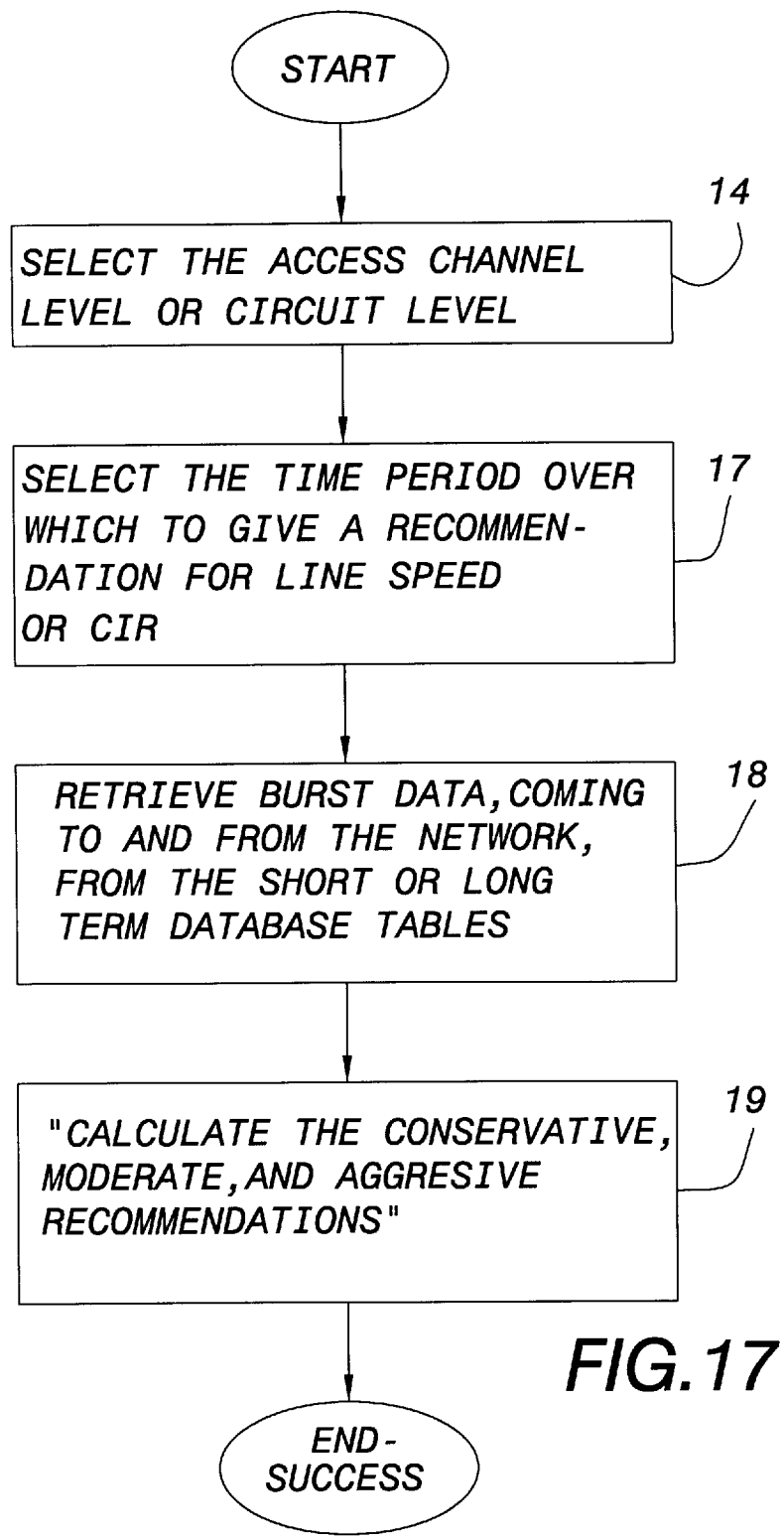
FIG. 17 is a procedural flowchart illustrating the manner in which the console analyzes the bandwidth utilization data to recommend a bandwidth adjustment according to the present invention.

Alternatively, console 16 may analyze the bandwidth utilization data and suggest whether to increase or decrease the access channel bandwidth or individual circuit committed information rate as illustrated in FIG. 17. Specifically, an operator selects at steps 14, 17 the access channel or circuit utilization information and time period for the console to analyze (i.e., two hour or two day) in substantially the same manner described above, and subsequently clicks on advisor button 52 (FIG. 11) to initiate the analysis. The console retrieves the appropriate data from the short and/or long term databases at step 18 and determines a series of recommendations for bandwidth adjustment at step 19 as described below. A conservative recommendation is least tolerable to high bandwidth utilization and recommends increasing the bandwidth after surpassing a low threshold. Conversely, the conservative recommendation ensures low bandwidth utilization for a substantial period of time and recommends decreasing the bandwidth after surpassing a high threshold. An aggressive recommendation is tolerable to high bandwidth utilization and recommends increasing the bandwidth upon surpassing a high threshold. A decrease in bandwidth is recommended by the aggressive recommendation after surpassing a low threshold indicating low bandwidth utilization for short periods of time. A moderate recommendation suggests increasing or decreasing the bandwidth upon surpassing respective thresholds set to values between the conservative and aggressive thresholds. The system determines each of the conservative, moderate and aggressive recommendations for the access channel and the selected individual circuits and indicates the recommendations in a report described below.

Once the operator selects the access channel or circuit utilization and time interval, and subsequently clicks on button 52, the console retrieves the appropriate data from the database tables and determines each of the recommendations described above. The conservative recommendation is determined in the manner illustrated in FIG. 18. Initially, the console sums the counts retrieved from the database tables for each respective percentage utilization counter in order to obtain the total counts for each respective counter during a two week time interval. The sums indicate the number of seconds within the time interval that bandwidth utilization was in the particular percentage range associated with the counter. The counter sums are then compared to threshold percentages of the time interval as described below. The counts of the counters representing the 0–10% and 0–20% ranges for the access channel and individual circuits, respectively, are not utilized in determining the bandwidth adjustment recommendation since these counts strongly bias the determination toward an idle line case (i.e., extremely low or no bandwidth utilization) that may result in an inappropriate bandwidth adjustment recommendation. Specifically, the console determines at step 102 whether the analysis is for the access channel or individual circuit. When the analysis is for the access channel, the console determines at step I 04 whether or not the topmost counter (i.e., the sum of the counts for the 91%–100% counter during the interval) exceeds ten percent of the time interval (i.e., whether or not high bandwidth utilization occurred in excess of 10% of the two week time interval). If the topmost counter exceeds 10% of the time interval, then the conservative recommendation suggests to increase the bandwidth at step 106. When the topmost counter does not exceed 10% of the time interval, the console determines at step 108 whether or not the second lowest counter (i.e., the sum of the counts for 11%–40% counter during the interval) exceeds 90% of the time interval (i.e., whether or not low bandwidth utilization occurred in excess of 90% of the two week time interval). Upon determining that the second lowest counter exceeds 90% of the time interval, the conservative recommendation suggests to decrease bandwidth at step 110. When the second lowest counter does not exceed 90% of the time interval, the conservative recommendation for the access channel suggests no adjustment of bandwidth at step 112.

When the analysis is for an individual circuit, the console determines at step 101 whether or not the sum of the top two counters for the interval period (i.e., the total of the sum of the counts for the greater than 180% and 121%–180% counters during the interval) exceeds 10% of the time interval (i.e., whether or not high utilization occurred in excess of 10% of the two week time interval). If the sum of the counters exceeds 10% of the time interval, then the conservative recommendation suggests to increase the committed information rate for the circuit at step 103. When the sum of the counts does not exceed 10% of the time interval, the console determines at step 105 whether or not the second lowest counter (i.e., the sum of the counts for the 21%–80% counter during the interval) exceeds 90% of the time interval (i.e., whether or not low utilization occurred in excess of 90% of the two week time interval). Upon determining that the second lowest counter exceeds 90% of the time interval, the conservative recommendation suggests to decrease the committed information rate for the circuit at step 107. When the second lowest counter does not exceed 90% of the time interval, the conservative recommendation for the individual circuit suggests no adjustment of the committed information rate at step 109. The above process is performed for each access channel direction (i.e., to and from the switching network) to determine recommendations for each access channel direction. When an additional probe is utilized on a circuit, a recommendation for a single circuit direction (i.e., to the switching network) for each probe is determined, otherwise only a single recommendation for a circuit (i.e., for data traveling to the switching network) is determined.

The manner in which the moderate recommendation is determined is illustrated in FIG. 19. The moderate recommendation is determined in substantially the same manner as the conservative recommendation described above except that the sums of the counts of the utilization percentage counters are compared against different thresholds to arrive at a bandwidth or committed information rate adjustment. Specifically, an increase in the access channel bandwidth is suggested at step 124 when the console determines at step 122 that the top most counter (i.e., the sum of the counts for 91%–100% counter during the interval) exceeds 25% of the time interval (i.e., high bandwidth utilization occurred in excess of 25% of the two week time interval), while a decrease in access channel bandwidth is suggested at step 128 when the console determines at step 126 that the second lowest counter (i.e., the sum of the counts for the 11%–40% counter during the interval) exceeds 75% of the time interval (i.e., low bandwidth utilization occurred in excess of 75% of the two week time interval). No adjustment for the access channel bandwidth is suggested at step 130 for other values of the sums of the counts for these counters. Similarly, an increase in the committed information rate is suggested at step 123 for an individual circuit when the console determines at step 121 that the sum of the top two counters for the interval period (i.e., the total of the sum of the counts for the greater than 180% and 121%–180% counters during the interval) exceeds 25% of the time interval (i.e., high bandwidth utilization occurred in excess of 25% of the two week time interval), while a decrease in the committed information rate for the circuit is suggested at step 127 when the console determines at step 125 that the second lowest counter (i.e., the sum of the counts for the 21%–80% counter during the interval) exceeds 75% of the time interval (i.e., low bandwidth utilization occurred in excess of 75% of the two week time interval). No adjustment for the committed information rate is suggested at step 129 for other values of the sums of the counts for these counters. The above process is performed for each access channel and circuit direction as described above.

The manner in which the aggressive recommendation is determined is illustrated in FIG. 20. The aggressive recommendation is determined in substantially the same manner as the conservative and moderate recommendations described above except that the sums of the counts for the utilization percentage counters are compared against different thresholds to arrive at the aggressive recommendation. Specifically, an increase in access channel bandwidth is suggested at step 144 when the console determines at step 142 that the top most counter (i.e., the sum of the counts for the 91%–100% counter during the interval) exceeds 50% of the time interval (i.e., high bandwidth utilization occurred in excess of 50% of the two week time interval), while a decrease in access channel bandwidth is suggested at step 148 when the console determines at step 146 that the second lowest counter (i.e., the sum of the counts for the 11%–40% counter during the interval) exceeds 50% of the time interval (i.e., low bandwidth utilization occurred in excess of 50% of the two week time interval). No adjustment for the access channel bandwidth is suggested at step 150 for other values of the sums of the counts for these counters. Similarly, an increase in the committed information rate is suggested for an individual circuit at step 143 when the console determines at step 141 that the sum of the top two counters for the time interval (i.e., the total of the sum of the counts for the greater than 180% and 121%–180% counters during the interval) exceeds 50% of the time interval (i.e., high bandwidth utilization occurred in excess of 50% of the two week time interval), while a decrease in committed information rate for the circuit is suggested at step 147 when the console determines at step 145 that the second lowest counter (i.e., the sum of the counts for the 21%–80% counter during the interval) exceeds 50% of the time interval (i.e., low bandwidth utilization occurred in excess of 50% of the two week time interval). No adjustment for the committed information rate for the circuit is suggested at step 149 for other values of the sums of the counts of these counters. The above process is performed for each access channel and circuit direction as described above.

The console determines the conservative, moderate and aggressive recommendations for each direction of data travel on the access channel (i.e., going to and from the switching network) and individual circuits (i.e., to the switching network) as described above. Once the conservative, moderate and aggressive recommendations are determined for each direction, the respective recommendations in each direction are examined to arrive at final conservative, moderate and aggressive recommendations provided to the operator as illustrated in FIG. 21. The console determines a final recommendation for each of the respective conservative, moderate and aggressive recommendations for the access channel and individual circuits in substantially the same manner described below. However, the final recommendations suggest an adjustment to bandwidth for the access channel analysis, while suggesting adjustments to the committed information rate for individual circuits. Specifically, the console determines at step 162 whether or not an increase in bandwidth or circuit committed information rate is suggested for either access channel (i.e., to and from the switching network) or circuit (i.e., to the switching network for a single probe or to the switching network for each probe when two probes are utilized as described above) direction. When an increase in the bandwidth or circuit committed information rate has been suggested, the final recommendation suggests to increase the access channel bandwidth or circuit committed information rate at step 164. Upon determining that an increase in bandwidth or circuit committed information rate has not been suggested, the console determines at step 161 whether or not no bandwidth or circuit committed information rate adjustment is suggested for either direction. When no bandwidth or circuit committed information rate adjustment has been suggested, the final recommendation suggests not to adjust the access channel bandwidth or circuit committed information rate at step 165. Upon determining that a "no adjustment" suggestion has not been made, the final recommendation suggests a decrease in the access channel bandwidth or circuit committed information rate at step 163.

After the operator views the bandwidth utilization, a report may be generated by the console in hardcopy form displaying the utilizations for a particular day or month. Specifically, the operator enters the time period for the report and the console generates exemplary reports as illustrated in Appendix A. The console retrieves the counts of the appropriate utilization percentage counters from the long term database for the selected interval, and sums the counts of the respective counters for the interval to display the information in graphical or tabular form as described below. In particular, report 1 in Appendix A is an exemplary report containing information relating to access channel bandwidth utilization for data going to the switching network on a particular day. An operator may specify to the console whether to generate a report for data going to or from the switching network. Report 1 displays the data in bar graph form generated in substantially the same manner as, and substantially similar to, the bar graphs described above having the number of hours within the day on the horizontal axis and the percentage of time (i.e., 0–100%) or number of seconds (i.e., 0–900) within each hour on the vertical axis. A coded vertical bar for each hour indicates the utilization percentages (e.g., in the range of 0–100% as described above) for that hour in substantially the same manner described above for the two hour and two day bar graphs. Report 1 further includes a key indicating the percentage ranges associated with the codes, the date the information was collected, the date the report is printed, the network, the site, the access line and line speed, and the values and units associated with the bar graph axes.

Similarly, report 2 of Appendix A is substantially similar to report 1 described above except that the report displays data in bar graph form for an entire month. The bar graph horizontal axis contains the number of days within the month while the bar graph vertical axis contains the percentage of time (i.e., 0–100%) or the number of seconds within each day. A coded vertical bar for each day indicates the utilization percentages for that day in substantially the same manner described above.

Reports for the individual circuits are substantially similar to reports 1 and 2 described above except that the percentages indicated by the codes (e.g., in the range extending from zero to greater than one hundred eighty percent as described above) are different and the report may only be generated utilizing data traveling to the switching network.

Alternatively, an operator may command the console to generate reports having the recommendations for adjusting the bandwidth and/or committed information rate as illustrated in exemplary reports 3 and 4 of Appendix A. Specifically, report 3 displays data for the access channel on a particular day in tabular form. Each row of the table corresponds to an hour within the day and contains information relating the amount of time (i.e., in percentages) within that hour that the access channel bandwidth utilization was in the percentage ranges associated with the probe counters described above. The table columns indicate the utilization percentage ranges (i.e., 0–10%, 11–40%, 41–60%, 61–90% and 91–100%) and include the ranges for data traveling both to and from the switching network. The sum of the counts for the utilization percentage counters indicate the time the bandwidth utilization is in a particular range and are utilized to determine the percentages contained in the table. The table further includes an additional summary row containing the totals for each of the table columns. Report 3 further displays the date of the information (i.e., the day), the date the report is printed, the network, the site, the access line and access line rate, and the conservative, moderate and aggressive recommendations for bandwidth adjustment.

Report 4 of Appendix A illustrates an exemplary report for an individual circuit and is substantially similar to report 3 described above except that table columns indicate percentage ranges for individual circuits (i.e., 0–20%, 21–80%, 81–120%, 121–180% and greater than 180%). Specifically, report 4 contains the information in tabular form as described above and further displays the date the information was collected, the date the report is printed, the network, the circuit name and path, and the conservative, moderate and aggressive recommendations for committed information rate adjustment for the circuit. Further, the table displays percentages for data traveling to the switching network and includes a label identifying the circuit. When an additional probe is utilized at the other end of the circuit, the table also includes percentage utilizations for data coming from that other end of the circuit or probe to the switching network.

Operation of the present invention is now described with reference to FIGS. 1, 2 and 11. Initially, a probe 12 is connected to a data transmission system at any desired location to monitor and collect information relating to system traffic as described above. An operator initiates monitoring software in console 16 to enable the console to display access channel and/or individual circuit bandwidth utilization. The operator enters the times to collect data from the probe and transfer data from a short term database to a long term database as described above. The probe determines the access channel bandwidth or circuit committed information rate, or these values may also be entered at the console by the operator as described above. The probe collects data transmission system information and increments the appropriate utilization percentage counters for the access channel and various transmission circuits associated with the access channel each sampling interval (e.g., one second), while the console retrieves the information from the probe at designated times and stores the information in the short term database as described above. The operator commands the console to display various data transmission system information for a two-hour or two-day history based on the data entered by the operator on window 20 (FIG. 11)

as described above. The console retrieves the appropriate data from the short term database based on the operator input, and displays the information in bar graph and pie chart form as described above. The operator may manipulate a pointer adjacent the bar graph to have the corresponding interval indicated by the pointer displayed in pie chart form. The operator may then command the console to analyze the data and recommend a conservative, moderate and aggressive strategy for modifying the access channel bandwidth and/or circuit committed information rate. Further, the operator may command the console to generate reports in hardcopy form displaying the access channel and/or individual circuit bandwidth utilization in bar graph form for a particular day or month, or the access channel and/or individual circuit bandwidth utilization in tabular form with the conservative, moderate and aggressive bandwidth and/or committed information rate recommendations.

The software for the console and microprocessor of the present invention is implemented in the "C++" programming language. However, it is to be understood that the software may be written in any of a number of computing languages to perform the console and microprocessor functions, and that such software can be developed by one of ordinary skill in the computer arts based on the above description and flow charts.

It will be appreciated that the embodiments described above and illustrated in the drawings represent only a few of the many ways of implementing the present invention to measure peak throughput in packetized data networks.

The console of the present invention may be implemented by any personal computer, UNIX workstation, or processor in combination with a monitor capable of processing and displaying the data in graphical form. Further, the windows or screens of the present invention may be arranged in any manner and contain any desired information. Moreover, the information may be displayed in any graphical or other form capable of conveying the utilization information. The bar graphs, pie charts and reports may contain any desired information extending for any desired period of time (e.g., hours, days, months etc.). The bar graphs and pie charts may utilize any color or other coding schemes, and display information for any desired percentage ranges. The bar graphs may utilize any information, labels or units partitioned in any manner on their horizontal and vertical axes to display data transmission system information as a function of any desired references (e.g., time, percentages, volume of data, etc.). In addition, the sampling and counting intervals may be set to any desired time interval capable of supplying a sufficient sample base while accommodating the limited resources of the probe.

Communications between the console and probe may be accomplished by busses, voice grade modems, the packetized data network being monitored, or any other means suitable for transporting data.

The probe may be implemented by any devices performing similar functions to the probe components described above, or any other data gathering devices capable of retrieving and processing network information. Further, the present invention may employ probes utilizing various other protocols for circuit level measurements, such as an Internet, HDLC multi-protocol, Asynchronous Transfer Mode (ATM) or X.25 multi-protocol type probe. Moreover, the probe may function as a stand-alone probe (e.g., passively monitoring the data transmission system) or be incorporated within a data transmission system component (e.g., an active component), such as a router. The counters may be of any quantity and associated with any desired percentage range, while being implemented by any data structures, variables, hardware (e.g., adders, accumulators etc) or other hardware or software constructs capable of maintaining the counts for various entities.

The thresholds (i.e., percentages of the time interval) for the conservative, moderate and aggressive recommendations may be modified to accommodate various data transmission systems. In addition, the system may be modified such that the recommendations suggest a particular amount of bandwidth adjustment depending upon the particular data transmission system activity. For example, the console may recommend an increase or decrease in the bandwidth and/or committed information rate by a certain amount or range of bandwidth.

The increment thresholds may be modified to accommodate different percentage ranges associated with the counters. Further, the increment and recommendation thresholds may be determined in any manner yielding equivalent results to the manner described above. For example, a probe may determine whether or not to increment a counter by determining the bandwidth utilization percentage for a measurement (i.e., number of bits divided by bandwidth capacity) and comparing that percentage to 10%, 40%, 60%, 90%, respectively, as described above. Similarly, the console may determine whether or not to recommend a bandwidth adjustment by determining the percentage of bandwidth utilization for an interval (i.e., the sum of counts for the percentage counters during an interval divided by the seconds in the interval) and comparing that percentage to the threshold percentage of the time interval (e.g., 10%, 25%, 50%, 75%, 90%) described above.

From the foregoing description it will be appreciated that the invention makes available a novel method and apparatus for measurement of peak throughput in packetized data networks wherein a probe collects data transmission system information via counters maintaining counts that represent access channel and individual circuit utilization percentages over a predetermined time interval for manipulation by a console to display the information in graphical form to an operator.

Having described preferred embodiments of a new and improved method and apparatus for measurement of peak throughput in packetized data networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

*Appendix A*

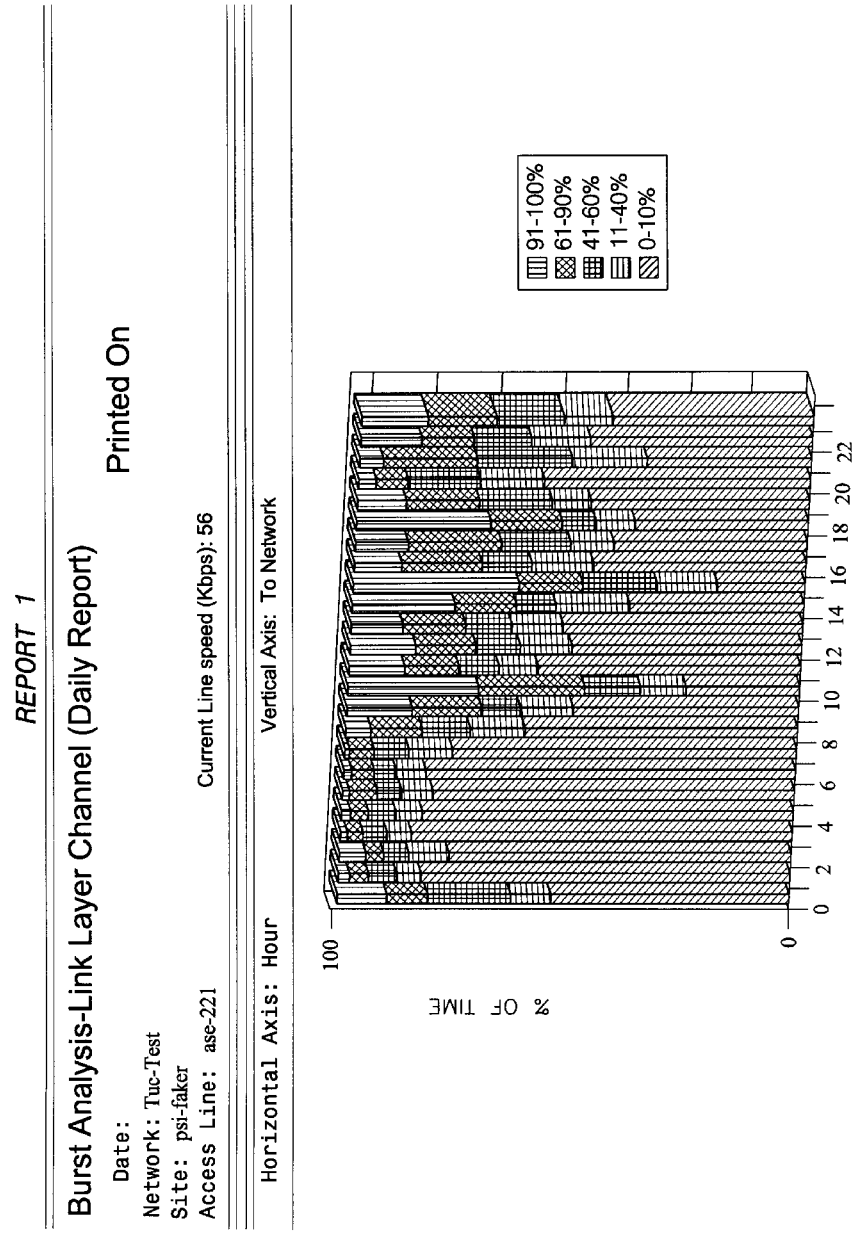

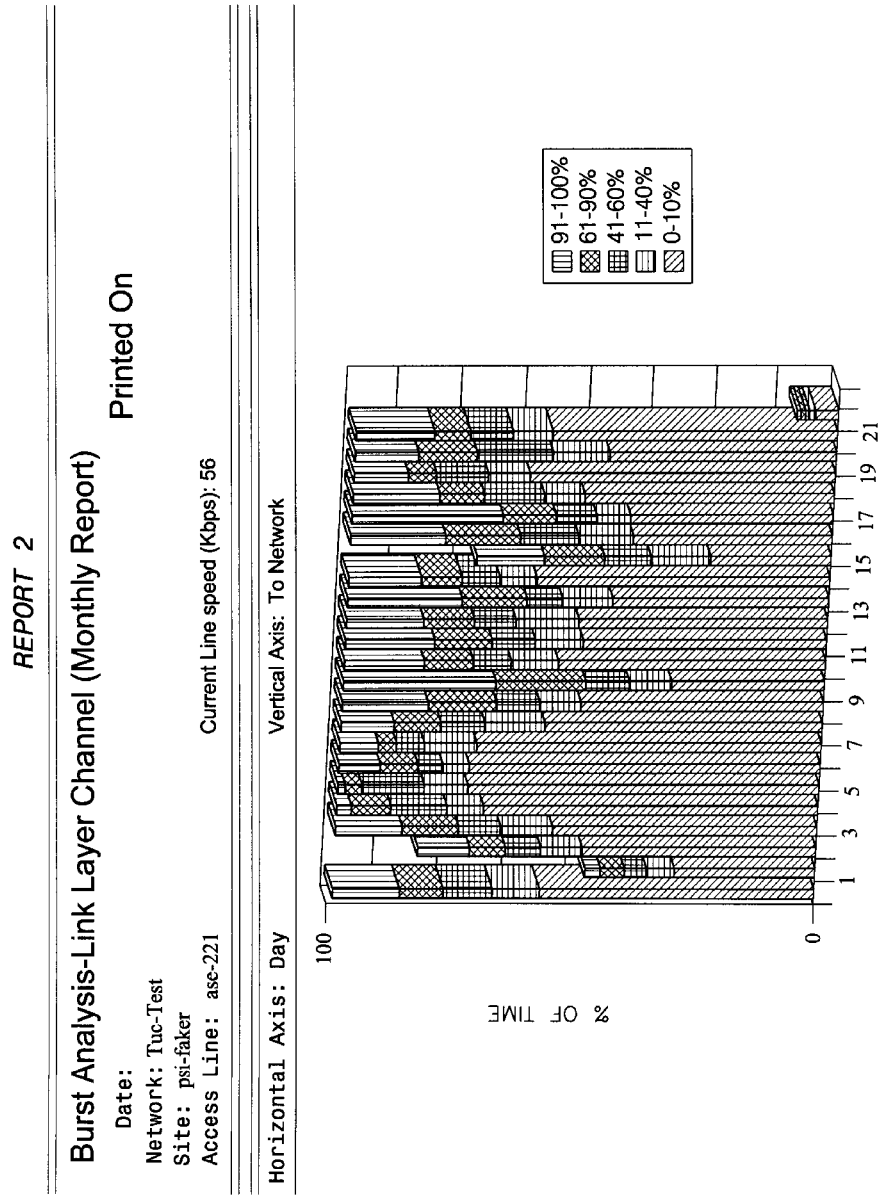

REPORT 3

Advisor - Link Layer Channel (Daily Report)

Date:
Network: Tuc-Test
Site: psi-faker
Acccess Line: ase-221

Current Line Speed (Kbps): 56

Printed On:

| Hour | Utilization Of Traffic In Direction Towards Network | | | | | Utilization Of Traffic In Direction From Network | | | | |
|---|---|---|---|---|---|---|---|---|---|---|
| | 0-10% | 11-40% | 41-60% | 61-90% | 91-100% | 0-10% | 11-40% | 41-60% | 61-90% | 91-100% |
| 0 | 52.61% | 10.67% | 17.67% | 11.53% | 7.53% | 95.58% | 4.42% | 0.00% | 0.00% | 0.00% |
| 1 | 84.14% | 5.44% | 5.11% | 2.56% | 2.75% | 98.58% | 1.42% | 0.00% | 0.00% | 0.00% |
| 2 | 77.78% | 9.31% | 5.61% | 2.64% | 4.67% | 98.06% | 1.94% | 0.00% | 0.00% | 0.00% |
| 3 | 86.17% | 5.64% | 4.17% | 2.83% | 1.19% | 98.47% | 1.53% | 0.00% | 0.00% | 0.00% |
| 4 | 84.11% | 5.56% | 5.67% | 3.06% | 1.61% | 97.92% | 2.08% | 0.00% | 0.00% | 0.00% |
| 5 | 83.00% | 5.69% | 5.58% | 4.42% | 1.31% | 96.97% | 3.03% | 0.00% | 0.00% | 0.00% |
| 6 | 85.36% | 5.19% | 5.11% | 2.25% | 2.08% | 98.61% | 1.36% | 0.03% | 0.00% | 0.00% |
| 7 | 78.58% | 10.64% | 5.56% | 3.75% | 1.47% | 95.00% | 4.19% | 0.61% | 0.17% | 0.03% |
| 8 | 64.44% | 12.53% | 9.06% | 9.31% | 4.67% | 96.61% | 3.28% | 0.11% | 0.00% | 0.00% |
| 9 | 57.28% | 8.53% | 9.17% | 14.03% | 11.00% | 89.61% | 9.86% | 0.42% | 0.03% | 0.08% |
| 10 | 38.25% | 8.86% | 9.42% | 19.14% | 24.33% | 81.06% | 18.44% | 0.50% | 0.00% | 0.00% |
| 11 | 62.81% | 9.67% | 7.92% | 10.00% | 9.61% | 87.92% | 11.89% | 0.19% | 0.00% | 0.00% |
| 12 | 57.83% | 10.14% | 8.78% | 11.58% | 11.67% | 90.17% | 9.53% | 0.28% | 0.03% | 0.00% |
| 13 | 59.17% | 13.03% | 8.69% | 10.00% | 9.11% | 89.94% | 9.42% | 0.61% | 0.03% | 0.00% |
| 14 | 52.25% | 10.69% | 7.42% | 13.39% | 16.25% | 86.94% | 12.11% | 0.67% | 0.25% | 0.03% |
| 15 | 38.67% | 9.11% | 9.89% | 10.92% | 31.42% | 74.08% | 21.03% | 2.89% | 1.69% | 0.31% |
| 16 | 56.81% | 12.33% | 9.56% | 11.97% | 9.33% | 77.53% | 15.83% | 4.53% | 1.78% | 0.33% |
| 17 | 49.36% | 11.17% | 12.28% | 15.00% | 12.19% | 87.33% | 12.08% | 0.56% | 0.03% | 0.00% |

| | Utilization Of Traffic In Direction Towards Network | | | | | Utilization Of Traffic In Direction From Network | | | | |
|---|---|---|---|---|---|---|---|---|---|---|
| Hour | 0-10% | 11-40% | 41-60% | 61-90% | 91-100% | 0-10% | 11-40% | 41-60% | 61-90% | 91-100% |
| 18 | 50.47% | 6.83% | 8.36% | 10.92% | 23.42% | 95.61% | 4.36% | 0.03% | 0.00% | 0.00% |
| 19 | 60.39% | 8.11% | 12.22% | 8.53% | 10.75% | 96.86% | 3.14% | 0.00% | 0.00% | 0.00% |
| 20 | 71.81% | 8.61% | 9.94% | 5.47% | 4.17% | 98.50% | 1.47% | 0.03% | 0.00% | 0.00% |
| 21 | 55.92% | 11.67% | 15.06% | 11.47% | 5.89% | 95.36% | 4.61% | 0.03% | 0.00% | 0.00% |
| 22 | 68.06% | 8.17% | 8.03% | 6.86% | 8.89% | 95.69% | 4.14% | 0.06% | 0.08% | 0.03% |
| 23 | 67.00% | 4.56% | 10.06% | 7.69% | 10.69% | 94.64% | 5.33% | 0.03% | 0.00% | 0.00% |
| Summary | 64.26% | 8.84% | 8.76% | 8.72% | 9.42% | 92.38% | 6.94% | 0.48% | 0.17% | 0.03% |

Conservative: Increase Speed
Moderate: Increase Speed
Aggressive: No change recommended 3.23% of the samples were available for this month.

REPORT 4

End-to-End PVC          Advisor (Daily Tabular Report)
Date:                                                                    Printed On:
Network: Tuc-Test
Permanent Virtual Circuit (PVC) Name: visual-internet-feed
PVC Path: Connecting psi-faker(DLCI 485) and visual internet (DLCI 485)

| Hour | psi-faker (DLCI 485) via ase-221 | | | | visual internet (DLCI 485) via ase-209 | | | |
|---|---|---|---|---|---|---|---|---|
| | 0-20% | 21-80% | 81-120% | 121-180% | >180% | 0-20% | 21-80% | 81-120% | 121-180% | >180% |
| 0 | 48.06% | 12.19% | 0.89% | 1.06% | 37.81% | 52.36% | 36.58% | 4.56% | 1.92% | 4.58% |
| 1 | 81.92% | 15.31% | 0.03% | 0.89% | 1.86% | 90.81% | 5.17% | 1.50% | 1.28% | 1.25% |
| 2 | 80.89% | 16.69% | 0.08% | 0.50% | 1.83% | 89.97% | 6.44% | 1.08% | 0.83% | 1.67% |
| 3 | 81.97% | 15.14% | 0.00% | 0.83% | 1.97% | 90.94% | 5.67% | 1.19% | 1.00% | 1.19% |
| 4 | 82.33% | 15.58% | 0.50% | 0.94% | 1.14% | 91.39% | 5.17% | 1.22% | 1.03% | 1.19% |
| 5 | 79.97% | 16.67% | 0.97% | 0.97% | 1.89% | 89.47% | 6.67% | 1.97% | 0.86% | 1.03% |
| 6 | 81.08% | 16.06% | 0.19% | 0.92% | 1.75% | 90.78% | 5.92% | 1.22% | 0.92% | 1.17% |
| 7 | 64.78% | 18.36% | 1.67% | 2.39% | 12.81% | 73.17% | 15.03% | 3.78% | 2.50% | 5.53% |
| 8 | 54.19% | 17.42% | 1.19% | 1.67% | 25.53% | 61.97% | 21.67% | 8.11% | 4.11% | 4.14% |
| 9 | 46.56% | 13.72% | 1.58% | 2.56% | 36.58% | 52.08% | 19.92% | 10.78% | 5.47% | 11.75% |
| 10 | 28.03% | 11.56% | 2.22% | 4.31% | 53.89% | 31.67% | 17.56% | 13.83% | 10.50% | 26.44% |
| 11 | 45.11% | 14.75% | 2.19% | 5.58% | 32.36% | 48.61% | 15.61% | 7.42% | 7.31% | 21.06% |
| 12 | 49.17% | 11.86% | 2.14% | 3.33% | 33.50% | 48.86% | 18.72% | 9.50% | 7.42% | 15.44% |
| 13 | 46.42% | 7.97% | 2.89% | 3.72% | 39.00% | 47.33% | 19.94% | 9.92% | 7.86% | 14.94% |
| 14 | 43.61% | 7.22% | 2.64% | 2.75% | 43.78% | 42.92% | 19.61% | 11.19% | 8.81% | 17.47% |
| 15 | 39.31% | 12.19% | 6.75% | 3.81% | 37.94% | 39.94% | 20.19% | 9.94% | 6.89% | 23.03% |
| 16 | 40.00% | 9.97% | 4.97% | 4.75% | 40.31% | 41.03% | 20.00% | 7.44% | 6.64% | 24.89% |
| 17 | 53.67% | 8.08% | 2.03% | 3.03% | 33.19% | 53.22% | 19.28% | 8.61% | 6.19% | 12.69% |
| 18 | 53.06% | 8.72% | 1.44% | 1.61% | 35.17% | 53.61% | 17.28% | 19.69% | 6.39% | 3.03% |
| 19 | 85.08% | 4.03% | 0.17% | 1.36% | 9.36% | 83.86% | 10.22% | 2.97% | 1.83% | 1.11% |
| 20 | 89.61% | 2.56% | 0.03% | 0.86% | 6.94% | 86.72% | 9.36% | 2.28% | 1.31% | 0.33% |
| 21 | 79.42% | 3.58% | 0.64% | 1.97% | 14.39% | 76.89% | 11.94% | 3.47% | 3.03% | 4.67% |
| 22 | 74.58% | 4.53% | 1.17% | 1.97% | 17.75% | 71.39% | 13.89% | 4.72% | 3.86% | 6.14% |
| 23 | 85.36% | 2.92% | 0.53% | 1.22% | 9.97% | 82.28% | 8.78% | 3.06% | 2.67% | 3.22% | page 1of2

| psi-faker (DLCI 485) via ase-221 | | | | | visual internet (DLCI 485) via ase-209 | | | | |
|---|---|---|---|---|---|---|---|---|---|
| Hour | 0-20% | 21-80% | 81-120% | 121-180% | >180% | 0-20% | 21-80% | 81-120% | 120-180% | >180% |
| Summary | 63.05% | 11.13% | 1.50% | 2.21% | 22.11% | 66.30% | 14.61% | 6.23% | 4.19% | 8.67% |

Conservative: Increase CIR
Moderate: Increase CIR
Aggressive: Increase CIR 3.23% of the samples for psi-faker and 3.23% of the samples for viual internet were available during this month.

What is claimed is:

1. An apparatus for measuring peak utilization of a data transmission system as a percentage of data transfer capacity of the system wherein said system includes a plurality of sites and a switching network with each of said plurality of sites coupled to said switching network via a respective access channel to facilitate communication between sites over individual transmission circuits, said apparatus comprising:

a probe connected to the data transmission system for measuring utilization of an access channel and individual transmission circuits associated with that channel, and generating capacity information relating to the utilization percentage of the data transfer capacity of said access channel and each of its individual transmission circuits during successive predetermined sampling intervals, said probe including:

a plurality of counters for maintaining said capacity information in the form of count totals, wherein each said counter is associated with a range of utilization percentages for at least one of said access channel and individual circuits and indicates a count of said sampling intervals during which the utilization percentage of said at least one of said access channel and individual circuits is in the range associated with that counter; and incrementing means, responsive to access channel and individual circuit utilization measurements in each sampling interval, for incrementing each counter for each sampling interval during which the utilization percentage of said at least one of said access channel and individual circuits is in the percentage range associated with that counter; and console means coupled to said probe for receiving said capacity information in the form of said count totals from said plurality of counters and processing said capacity information to selectively display data transfer capacity utilization for the access channel and individual circuits over a predetermined time interval.

2. The apparatus of claim 1 wherein said probe includes means for measuring said utilization for said access channel as data traveling in each direction to and from the switching network, and means for generating said information relating to the utilization percentage of the data transfer capacity of said access channel for each said direction as a function of a fixed access channel bandwidth.

3. The apparatus of claim 2 wherein said plurality of counters includes five counters for each said direction with each of said five counters corresponding to different respective utilization sub-percentage ranges within an overall range between zero and one-hundred percent.

4. The apparatus of claim 1 wherein said probe includes means for measuring said utilization for said individual circuits as data traveling to said switching network, and means for generating information relating to the utilization percentage of the circuit data transfer capacity for each individual circuit as a function of a circuit committed information rate for the individual circuit.

5. The apparatus of claim 4 wherein said plurality of counters includes five counters for each circuit with each of said five counters corresponding to different respective utilization percentage sub-ranges within an overall range extending from zero to greater than one-hundred eighty percent.

6. The apparatus of claim 1 further comprising:

advisor means for analyzing said access channel and individual circuit utilization percentage information and automatically recommending a plurality of data transfer capacity adjustments for said access channel and each individual circuit.

7. The apparatus of claim 6 wherein said advisor means includes recommendation means for recommending a predetermined data transfer capacity adjustment for said access channel and individual circuits, respectively, wherein an increase in access channel and individual circuit capacity is recommended when said plurality of counters indicate the occurrence of high utilization percentage of access channel and individual circuit data transfer capacity, respectively, in excess of a first specified percentage of a predetermined time interval, and a decrease in access channel and individual circuit capacity is recommended when said plurality of counters indicate the occurrence of low utilization percentage of access channel and individual circuit data transfer capacity, respectively, in excess of a second specified percentage of the predetermined time interval.

8. The apparatus of claim 7 wherein said predetermined adjustment is a conservative adjustment, said first specified percentage is ten percent, and said second specified percentage is ninety percent.

9. The apparatus of claim 7 wherein said predetermined adjustment is a moderate adjustment, said first specified percentage is twenty-five percent, and said second specified percentage is seventy-five percent.

10. The apparatus of claim 7 wherein said predetermined adjustment is an aggressive adjustment, said first specified percentage is fifty percent, and said second specified percentage is fifty percent.

11. The apparatus of claim 1 wherein said console means includes display means for selectively displaying the data transfer capacity utilization of the access channel and individual circuits in graphical form.

12. The apparatus of claim 11 wherein said display means includes means for selectively displaying the data transfer capacity utilization of the access channel and individual circuits in the form of a bar graph for a user-specified time interval.

13. The apparatus of claim 12 wherein said display means further includes means for selectively displaying the data transfer capacity utilization for the access channel and individual circuits in the form of a pie chart for a user-specified interval selected from said bar graph.

14. The apparatus of claim 6 further comprising report means for selectively generating reports containing data transfer capacity utilization information and said plurality of data transfer capacity adjustments for said access channel and individual circuits over a user-specified time interval.

15. The apparatus of claim 4 further including a plurality of said probes coupled to said data transmission system wherein a probe is disposed at each end of an individual circuit to enable measurement of circuit data transfer capacity utilization for data traveling to the switching network from each of the probes disposed at each end of the circuit.

16. A method for measuring peak utilization of a data transmission system as a percentage of data transfer capacity of the system wherein said system includes a plurality of sites and a switching network with each of said plurality of sites coupled to said switching network via a respective access channel to facilitate communication between sites over individual transmission circuits, said method comprising the steps of:

(a) measuring utilization of an access channel and individual transmission circuits associated with that channel, and generating capacity information in the form of count totals maintained by a plurality of counters and relating to the utilization percentage of the data transfer capacity of said access channel and each of its individual circuits during successive predetermined sampling intervals by assigning each said counter a range of utilization percentages for at least one of said access channel and individual circuits to indicate a count of said sampling intervals during which the utilization percentage of said at least one of said access channel and individual circuits is in the range assigned to that counter, and incrementing each counter for each sampling interval during which the utilization percentage of said at least one of said access channel and individual circuits is in the percentage range assigned to that counter; and (b) processing said capacity information in the form of said count totals from said plurality of counters to selectively display data transfer capacity utilization for the access channel and individual circuits over a predetermined time interval.

17. The method of claim 16 wherein step (a) further includes:

(a.1) measuring utilization for said access channel as data traveling in each direction to and from the switching network; and (a.2) generating said information relating to the utilization percentage of the data transfer capacity of the access channel for each said direction as a function of a fixed access channel bandwidth.

18. The method of claim 17 wherein said plurality of counters includes five counters for each said direction, and step (a.2) includes:

(a.2.1) assigning each of said five counters a different respective utilization percentage range within an overall range between zero and one-hundred percent.

19. The method of claim 16 wherein step (a) further includes:

(a.1) measuring utilization for said individual circuits as data traveling to said switching network; and (a.2) generating said information relating to the utilization percentage of the circuit data transfer capacity for each circuit as a function of the circuit committed information rate.

20. The method of claim 19 wherein said plurality of counters includes five counters for each circuit, and step (a.2) includes:

(a.2.1) assigning each of said five counters a different respective utilization percentage range within an overall range extending from zero to greater than one-hundred eighty percent.

21. The method of claim 16 further comprising the step of:

(c) analyzing said access channel and individual circuit utilization percentage information and recommending a plurality of data transfer capacity adjustments for said access channel and each individual circuit.

22. The method of claim 21 wherein step (c) further includes:

(c.1) recommending a predetermined data transfer capacity adjustment for said access channel and individual circuits, respectively, wherein an increase in access channel and individual circuit capacity is recommended when said plurality of counters indicate the occurrence of high utilization percentage of access channel and individual circuit data transfer capacity, respectively, in excess of a first specified percentage of a predetermined time interval, and a decrease in access channel and individual circuit capacity is recommended when said plurality of counters indicate the occurrence of low utilization percentage of access channel and individual circuit data transfer capacity, respectively, in excess of a second specified percentage of the predetermined time interval.

23. The method of claim 22 wherein said predetermined adjustment is a conservative adjustment, said first specified percentage is ten percent, and said second specified percentage is ninety percent.

24. The method of claim 22 wherein said predetermined adjustment is a moderate adjustment, said first specified percentage is twenty-five percent, and said second specified percentage is seventy-five percent.

25. The method of claim 22 wherein said predetermined adjustment is an aggressive adjustment, said first specified percentage is fifty percent, and said second specified percentage is fifty percent.

26. The method of claim 16 wherein step (b) includes:

(b.1) selectively displaying the data transfer capacity utilization for the access channel and individual circuits in graphical form.

27. The method of claim 26 wherein step (b.1) further includes:

(b.1.1) selectively displaying the data transfer capacity utilization for the access channel and individual circuits in the form of a bar graph for a user-specified interval.

28. The method of claim 27 wherein step (b.1) further includes:

(b.1.2) selectively displaying the data transfer capacity utilization for the access channel and individual circuits in the form of a pie chart for a user-specified interval selected from said bar graph.

29. The method of claim 21 further comprising the step of:

(d) selectively generating reports containing data transfer capacity information and said plurality of data transfer capacity adjustments for the access channel and individual circuits over a user-specified time interval.

30. The method of claim 19 wherein said data transmission system further includes a plurality of probes with a probe disposed at each end of an individual circuit and step (a.1) includes:

(a.1.1) measuring circuit data transfer capacity utilization for data traveling to the switching network from each of the probes disposed at each end of the circuit.

31. A method for measuring peak utilization of a data transmission system as a percentage of system data transfer capacity comprising the steps of:

(a) measuring utilization percentage of system data transfer capacity by determining an amount of time within a time period that system data transfer capacity utilization resides in different utilization percentage ranges; and (b) displaying the system data transfer capacity utilization for a user-specified time interval in relation to the amount of time the system data transfer capacity utilization percentage resided in said utilization percentage ranges.

* * * * *